(12) United States Patent
Yao et al.

(10) Patent No.: US 11,778,491 B2
(45) Date of Patent: Oct. 3, 2023

(54) 5G USER PLANE PACKET DELAY PERFORMANCE MEASUREMENTS

(71) Applicant: Intel Corporation, Santa Clara, CA (US)

(72) Inventors: Yizhi Yao, Chandler, AZ (US); Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 16/939,732

(22) Filed: Jul. 27, 2020

(65) Prior Publication Data

US 2020/0359244 A1 Nov. 12, 2020

Related U.S. Application Data

(60) Provisional application No. 62/882,431, filed on Aug. 2, 2019, provisional application No. 62/882,432, filed on Aug. 2, 2019.

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
CPC .............................. H04W 24/08; H04W 24/10
USPC ........................................................ 370/252
See application file for complete search history.

(56) References Cited

U.S. PATENT DOCUMENTS

| | | | |
|---|---|---|---|
| 2016/0055135 A1* | 2/2016 | Lee | G06F 40/221 715/234 |
| 2018/0279180 A1* | 9/2018 | Lee | H04L 67/14 |
| 2020/0145876 A1* | 5/2020 | Dao | H04W 80/10 |
| 2020/0267088 A1* | 8/2020 | Navrátil | H04L 43/16 |

\* cited by examiner

*Primary Examiner* — Christopher M Crutchfield
*Assistant Examiner* — Jean F Voltaire
(74) *Attorney, Agent, or Firm* — Schwegman Lundberg & Woessner, P.A.

(57) ABSTRACT

Systems and methods for measurement and reporting of average UL and DL delays and delay distributions for an NG-RAN and UPF, as well as gNB-DU DL latency, for the N3 and N9 interfaces, internal UPF delay, and between the PSA UPF and NG-RAN and between the PSA UPF and UE are described. For the UL and DL average delay and delay distributions, the measurements are split into subcounters per 5QI/QCI, S-NSSAI and/or DSCPs, with the delay distributions subcounters in bins with discrete delay ranges. The measurements aon the N3 interface delay are also differentiated between a PSA UPF and an I-UPF.

20 Claims, 8 Drawing Sheets

5G USER PLANE PACKET DELAY PERFORMANCE MEASUREMENTS

PRIORITY CLAIM

This application claims the benefit of priority to U.S. Provisional Patent Application Ser. No. 62/882,431, filed Aug. 2, 2019 and U.S. Provisional Patent Application Ser. No. 62/882,432, filed Aug. 2, 2019, each of which is incorporated herein by reference in its entirety.

TECHNICAL FIELD

Embodiments pertain to radio access networks. Some embodiments relate to performance measurements in Third Generation Partnership Project Long Term Evolution 5th generation (5G) networks.

BACKGROUND

The use of 3GPP networks has increased due to both an increase in the types of devices user equipment (UEs) using network resources as well as the amount of data and bandwidth being used by various applications, such as video streaming, operating on these UEs. The 5G network, which like previous generations of networks includes both a radio-access network (RAN) and a core network (CN), has been developed to answer the enormous increase in number and diversity of communication devices. Performance measurements may be used to better optimize resource allocation in networks. In particular, it may be desirable to monitor user plane data delay measurements in the 5G network.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
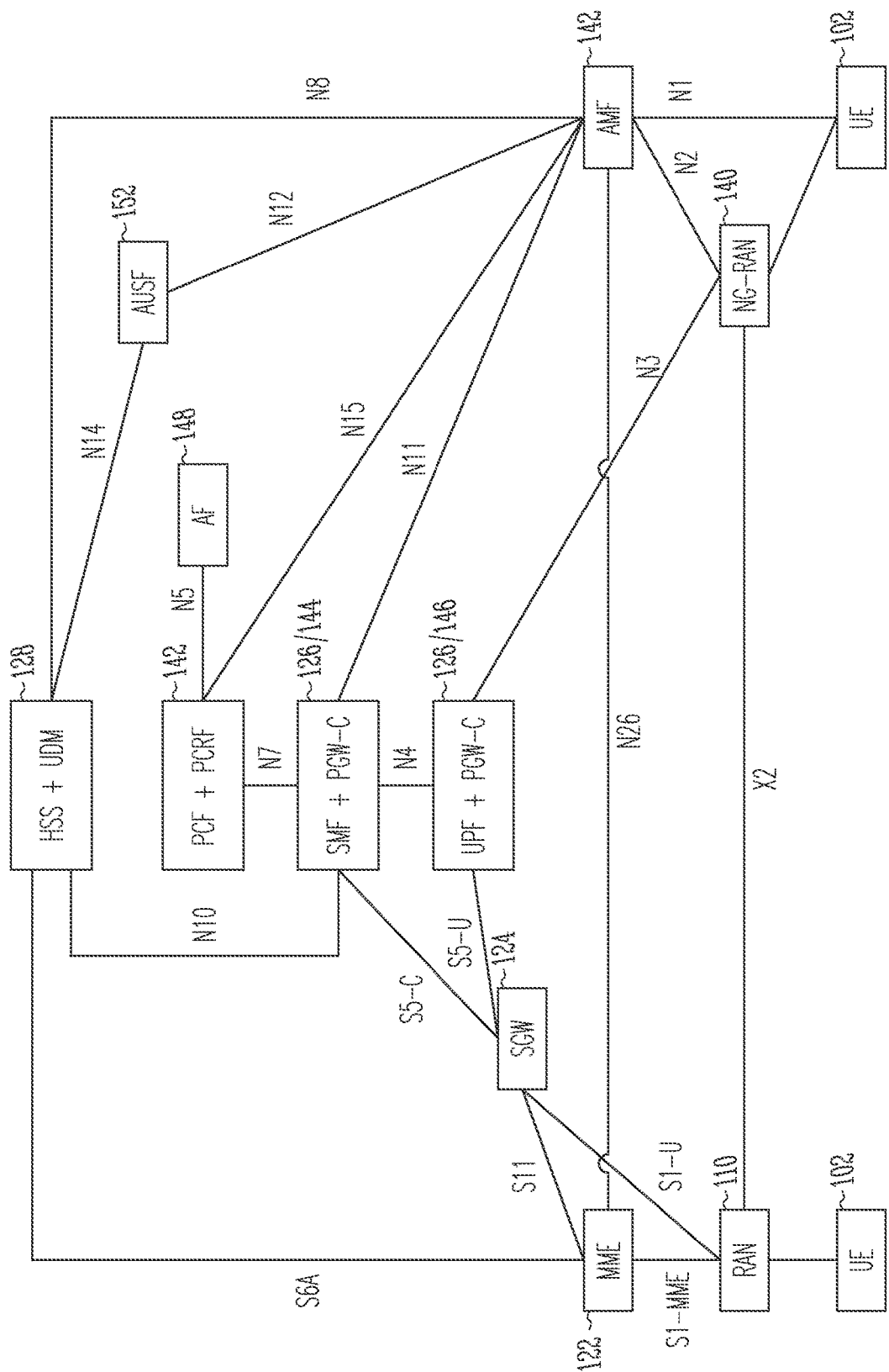
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform. e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and packet data network (PDN) gateway (P-GW) 126.

In the NG network, the control plane and the user plane may be separated, which may permit independent scaling and distribution of the resources of each plane. The UE 102 may be connected to either an access network or radio-access network (RAN) 110 and/or may be connected to the NG-RAN 130 (gNB) or an Access and Mobility Function (AMF) 142. The RAN may be an eNB, a gNB or a general non-3GPP access point, such as that for Wi-Fi. The NG core network may contain multiple network functions besides the AMF 112. The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
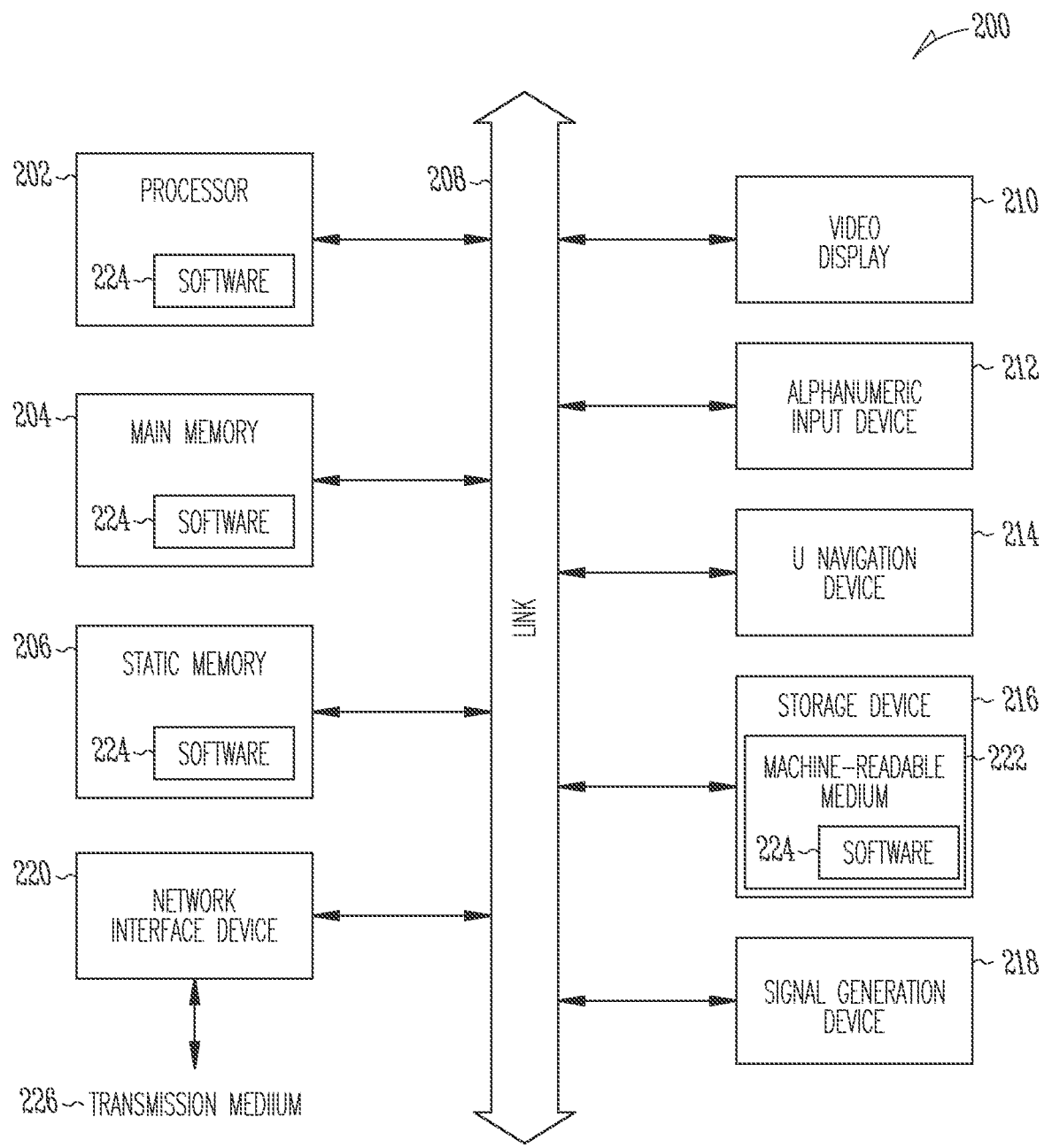
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Figure 3A:
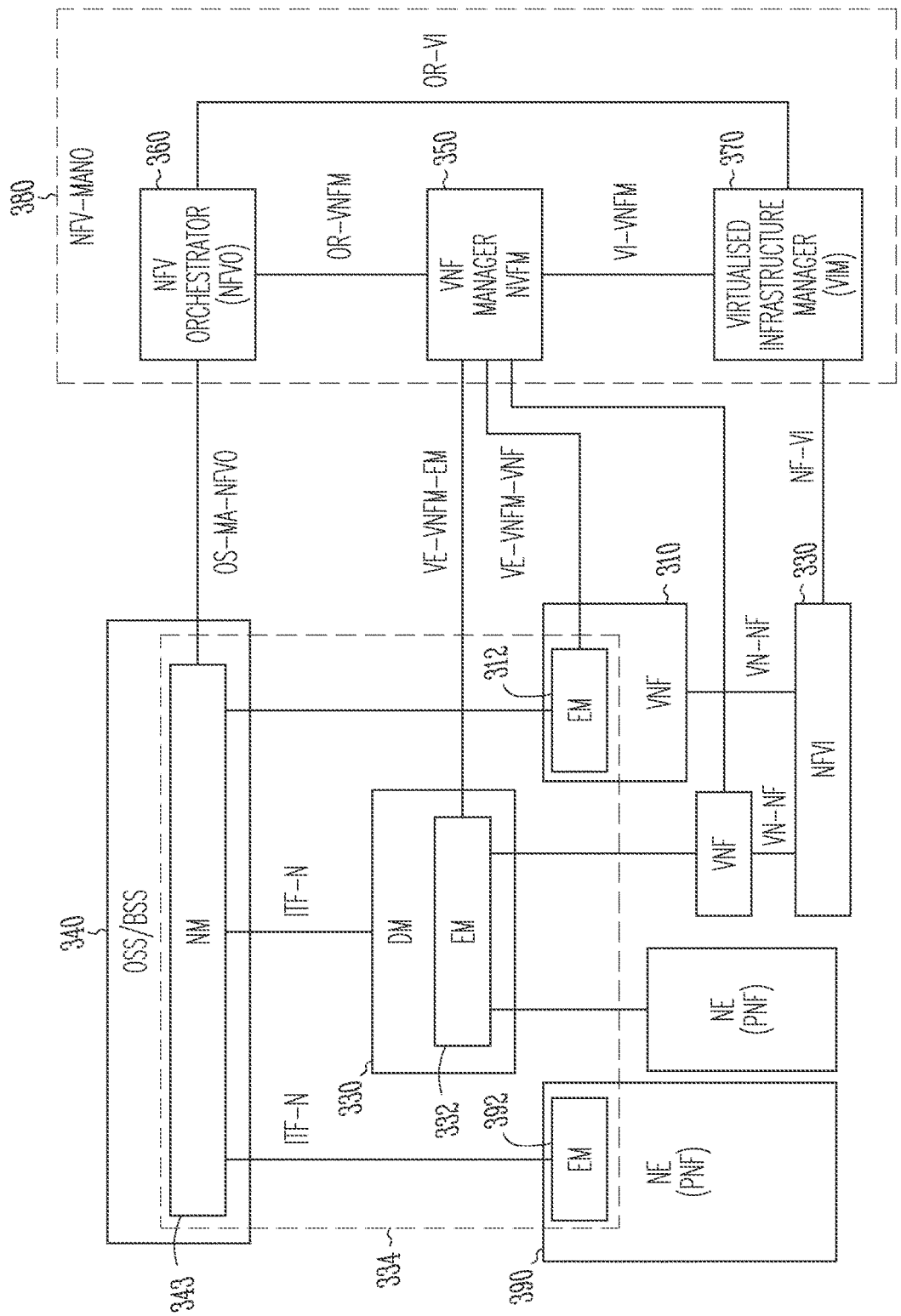
FIG. 3A illustrates a Network Function Virtualization (NFV) network management architecture in accordance with some embodiments.

FIG. 3A illustrates an NFV network management architecture in accordance with some embodiments. As illustrated, the NFV network management architecture 300 may include a number of elements (each of which may contain physical and/or virtualized components), including a Network Virtualization Function Infrastructure (NVFI) 310, Network elements (NEs) 390, Virtual Network Functions (VNFs) 320, a Domain Manager (DM) 330, an Element Manager (EM) 332, a Network Manager (NM) 342, and an NFV Management and Orchestration (NFV-MANO) 380. The NFV-MANO 380, which may be replaced as indicated herein by multiple NFV-MANO, may comprise a Virtualized Infrastructure Manager (VIM) 340, a VNF Manager (VNFM) 350, and a Network Function Virtualization Orchestrator (NFVO) 360. The NM 342 may be contained in an Operations Support System/Business Support System (OSS/BSS) 320, with the DM 330 and NM 342 forming the 3GPP management system 314.

The NFV network management architecture 300 may be implemented by, for example, a data center comprising one or more servers in the cloud. The NFV network management architecture 300, in some embodiments, may include one or more physical devices and/or one or more applications hosted on a distributed computing platform, a cloud computing platform, a centralized hardware system, a server, a computing device, and/or an external network-to-network interface device, among others. In some cases, the virtualized resource performance measurement may include, for example, latency, jitter, bandwidth, packet loss, nodal connectivity, compute, network, and/or storage resources, accounting, fault and/or security measurements. In particular, the NEs 390 may comprise physical network functions (PNF) including both hardware such as processors, antennas, amplifiers, transmit and receive chains, as well as software. The VNFs 320 may be instantiated in one or more servers. Each of the VNFs 320, DM 330 and the NEs 390 may contain an EM 322, 332, 392.

The NFV Management and Orchestration (NFV-MANO) 380 may manage the NFVI 310. The NFV-MANO 380 may orchestrate the instantiation of network services, and the allocation of resources used by the VNFs 320. The NFV-MANO 380 may, along with the OSS/BSS 340, be used by external entities to deliver various NFV business benefits. The OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling. The NFV-MANO 380 may create or terminate a VNF 320, increase or decrease the VNF capacity, or update or upgrade software and/or configuration of a VNF. The NFV-MANO 380 may include a Virtualized Infrastructure Manager (VIM) 370, a VNF Manager (VNFM) 350 and a NFV Orchestrator (NFVO) 360. The NFV-MANO 380 may have access to various data repositories including network services, VNFs available, NFV instances and NFVI resources with which to determine resource allocation.

The VIM 370 may control and manage the NFVI resources via Nf-Vi reference points within the infrastructure sub-domain. The VIM 370 may further collect and forward performance measurements and events to the VNFM 350 via Vi-VNFM and to the NFVO 360 via Or-Vi reference points. The NFVO 360 may be responsible for managing new VNFs and other network services, including lifecycle management of different network services, which may include VNF instances, global resource management, validation and authorization of NFVI resource requests and policy management for various network services. The NFVO 360 may coordinate VNFs 320 as part of network services that jointly realize a more complex function, including joint instantiation and configuration, configuring required connections between different VNFs 320, and managing dynamic changes of the configuration. The NFVO 360 may provide this orchestration through an OS-Ma-NFVO reference point with the NM 342. The VNFM 350 may orchestrate NFVI resources via the VIM 370 and provide overall coordination and adaptation for configuration and event reporting between the VIM 320 and the EMs and NMs. The former may involve discovering available services, managing virtualized resource availability/allocation/release and providing virtualized resource fault/performance management. The latter may involve lifecycle management that may include instantiating a VNF, scaling and updating the VNF instances, and terminating the network service, releasing the NFVI resources for the service to the NFVI resource pool to be used by other services.

The VNFM 350 may be responsible for the lifecycle management of the VNFs 320 via the Ve-VNFM-VNF reference point and may interface to EMs 322, 332 through the Ve-VNFM-EM reference point. The VNFM 350 may be assigned the management of a single VNF 320, or the management of multiple VNFs 320 of the same type or of different types. Thus, although only one VNFM 350 is shown in FIG. 3A, different VNFMs 350 may be associated with the different VNFs 320 for performance measurement and other responsibilities. The VNFM 350 may provide a number of VNF functionalities, including instantiation (and configuration if required by the VNF deployment template), software update/upgrade, modification, scaling out/in and up/down, collection of NFVI performance measurement results and faults/events information and correlation to VNF instance-related events/faults, healing, termination, lifecycle management change notification, integrity management, and event reporting.

The VIM 370 may be responsible for controlling and managing the NFVI compute, storage and network resources, usually within one operator's Infrastructure Domain. The VIM 370 may be specialized in handling a certain type of NFVI resource (e.g. compute-only, storage-only, networking-only), or may be capable of managing multiple types of NFVI resources. The VIM 370 may, among others, orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g. hypervisors), and discovery of the capabilities and features (e.g. related to usage optimization) of such resources.

The NVFI 310 may itself contain various virtualized and non-virtualized resources. These may include a plurality of virtual machines (VMs) 312 that may provide computational abilities (CPU), one or more memories 314 that may provide storage at either block or file-system level and one or more networking elements 316 that may include networks, subnets, ports, addresses, links and forwarding rules to ensure intra- and inter-VNF connectivity.

Each VNF 320 may provide a network function that is decoupled from infrastructure resources (computational resources, networking resources, memory) used to provide the network function. Although not shown, the VNFs 320 can be chained with other VNFs 320 and/or other physical network function to realize a network service. The virtualized resources may provide the VNFs 320 with desired resources. Resource allocation in the NFVI 310 may simultaneously meet numerous requirements and constraints, such as low latency or high bandwidth links to other communication endpoints.

The VNFs 320, like the NEs 390 may be managed by one or more EMs 322, 332, 392. The EM may provide functions for management of virtual or physical network elements, depending on the instantiation. The EM may manage individual network elements and network elements of a sub-network, which may include relations between the network elements. For example, the EM 322 of a VNF 320 may be responsible for configuration for the network functions provided by a VNF 320, fault management for the network functions provided by the VNF 320, accounting for the usage of VNF functions, and collecting performance measurement results for the functions provided by the VNF 320.

The EMs 322, 332, 392 (whether in a VNF 320 or NE 390) may be managed by the NM 342 of the OSS/BSS 340 through Itf-N reference points. The NM 342 may provide functions with the responsibility for the management of a network, mainly as supported by the EM 332 but may also involve direct access to the network elements. The NM 342 may connect and disconnect VNF external interfaces to physical network function interfaces at the request of the NFVO 360.

The various components of the system may be connected through different reference points. The references points between the NFV-MANO 380 and the functional blocks of the system may include an Os-Ma-NFVO between the NM 342 and NFVO 360, a Ve-VNFM-EM between the EM 322, 332 and the VNFM 350, a Ve-VNFM-VNF between a VNF 320 and the VNFM 350, a Nf-Vi between the NFVI 310 and the VIM 370, an Or-VNFM between the NFVO 360 and the VNFM 350, an Or-Vi between the NFVO 360 and the VIM 370, and a Vi-VNFM between the VIM 370 and the VNFM 350. An Or-Vi interface may implement the VNF software image management interface and interfaces for the management of virtualized resources, their catalogue, performance and failure on the Or-Vi reference point. An Or-Vnfm interface may implement a virtualized resource management interface on the Or-Vnfm reference point. A Ve-Vnfm interface may implement a virtualized resource performance/fault management on the Ve-Vnfm reference point.

Network management and network slicing are evolving towards a service-based architecture to provide different services for 5G networks. For example, the various services may include Machine Type Communication (MTC) (or internet of things (IoT)) services, enhanced Mobile Broadband (eMBB) services, and Ultra-Reliable and Low Latency Communications (URLLC) services, and vehicle-to-anything (V2X) services, among others. Network slicing is a form of virtualization that allows multiple virtual networks to run on top of a common shared physical network infrastructure. Network slicing serves service requirements by providing isolation between network resources, as well as permitting an optimized topology and specific configuration to be developed for each network slice. This permits network slicing in 5G networks to enable the orchestration and management of network slices to meet various service requirements.

Figure 3B:
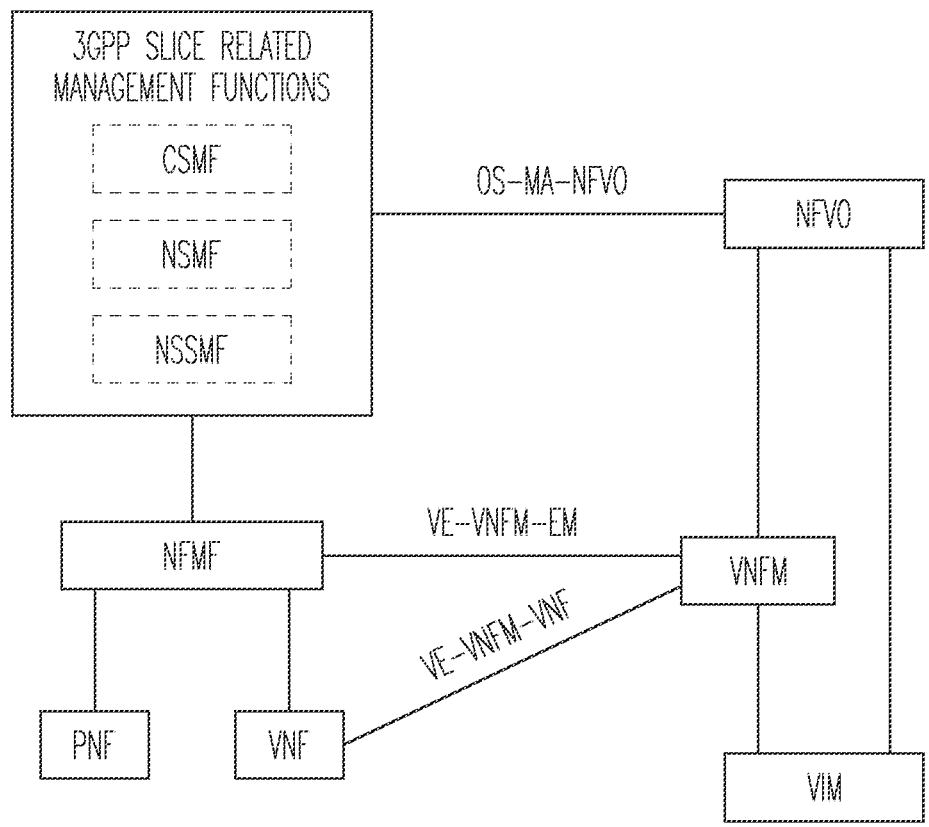
FIG. 3B illustrates network slice management in an NFV framework in accordance with some embodiments.

FIG. 3B illustrates network slice management in an NFV framework in accordance with some embodiments. As shown, a network slice may contain one or more network slice subnets. Each network slice subnet may include one or more network functions (either or both VNFs and PNFs). Network slicing management may include 3GPP slice management functions that interact with the NFVO through the Os-Ma-nfvo reference point. Similarly, the Ve-Vnfm-em reference point may be used for exchanges between NFMF and VNF Manager. The 3GPP slicing management functions include Communication Service Management Function (CSMF), Network Slice Management Function (NSMF), and Network Slice Subnet Management Function (NSSMF). The CSMF may translate the communication service-related requirement to network slice related requirements. The NSMF may be responsible for management and orchestration of the NSI and may provide communication with the NSSMF and CSMF. The NSSMF may be responsible for management and orchestration of the NSSI.

Figure 4:
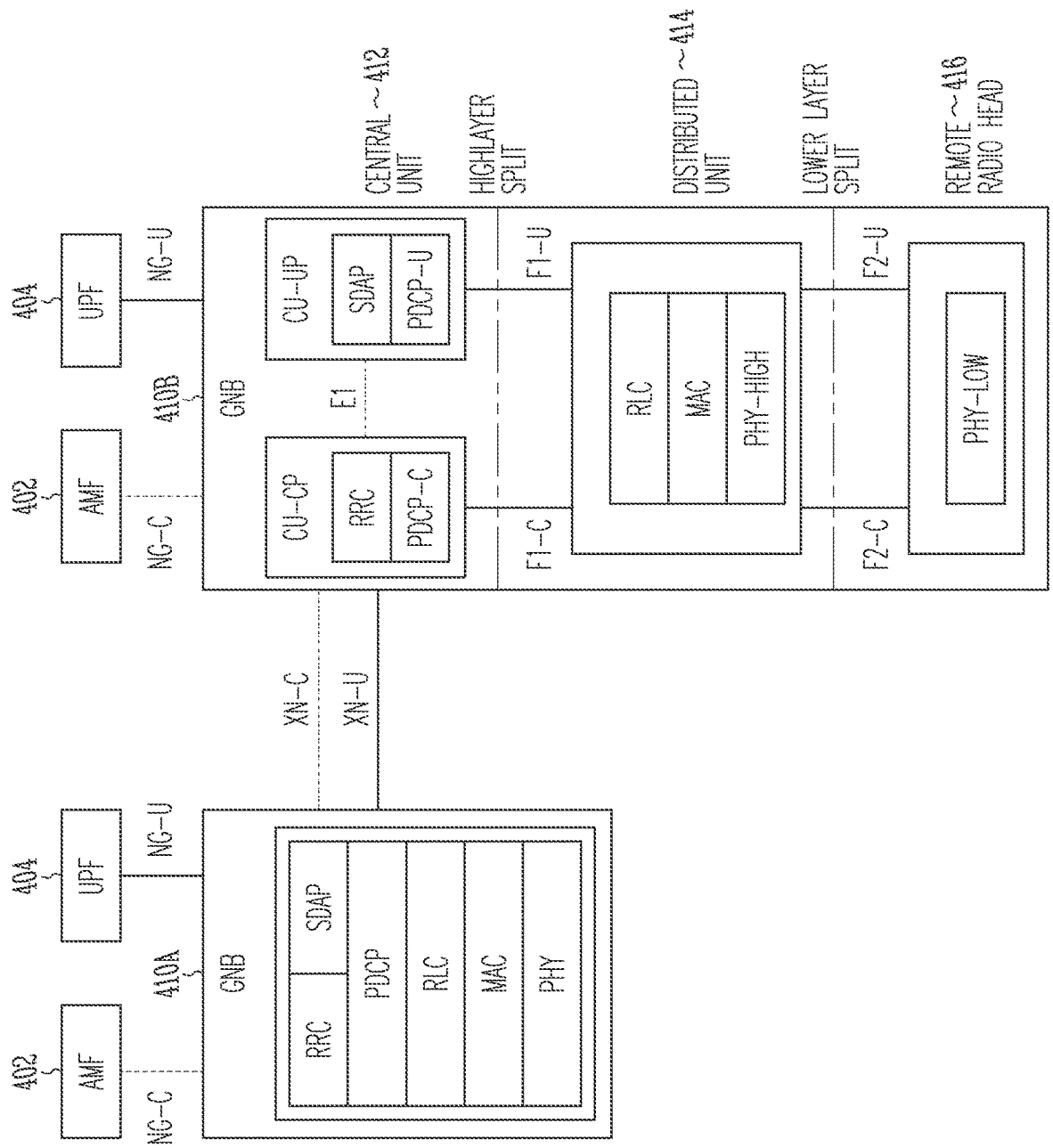
FIG. 4 illustrates interconnections for gNBs in accordance with some embodiments.

FIG. 4 illustrates interconnections for gNBs in accordance with some embodiments. As shown in FIG. 4, the gNBs 410a, 410b of the NG-RAN 410 may each be connected with different AMFs 402 and UPFs 404 through an NG-Control plane (NG-C) interface and an NG-User plane (NG-U or, as indicated in FIG. 1, N3) interface, respectively. In some embodiments, the gNBs 410a, 410b The gNBs 410a. 410b may be connected with each other via dual Xn interfaces for control plane signaling (Xn-C) and user plane signaling (Xn-U). The control plane functions of the Xn-C interface may include interface management and error handling functionality, connected mode mobility management, support of RAN paging and dual connectivity functions, among others. Examples of the interface management and error handling functionality include setup, reset, removal and configuration update of the Xn interface. Examples of connected mode mobility management include handover procedures, sequence number status transfer and UE context retrieval. Examples of dual connectivity functions include secondary node addition, reconfiguration, modification, and release of the secondary node. The user plane functions of the Xn-U interface may include both data forwarding and flow control between the gNBs 410a, 410b.

Each of the gNBs 410a, 410b may implement protocol entities in the 4GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB 410a. 410b may be distributed in different units—a Central Unit (CU) 412, at least one Distributed Unit (DU) 414, and a Remote Radio Head (RRH) 416. The CU 412 may provide functionalities such as the control the transfer of user data, and effect mobility control, radio access network sharing, positioning, and session management, except those functions allocated exclusively to the DU 414.

As shown in FIG. 4, the higher protocol layers (PDCP and RRC for the control plane/PDCP and SDAP for the user plane) may be implemented in the CU 412, and the RLC and MAC layers may be implemented in the DU 414. The PHY layer may be split, with the higher PHY layer also implemented in the DU 414, while the lower PHY layer is implemented in the Remote Radio Head 416. The CU 412, DU 414 and RRH 416 may be implemented by different manufacturers, but may nevertheless be connected by the appropriate interfaces therebetween. The CU 412 may be connected with multiple DUs 414.

The interfaces within the gNB include the E1 and fronthaul (F) F1 interface. As shown, a F2 interface may also be present. The E1 interface may be between a CU control plane (gNB-CU-CP) and the CU user plane (gNB-CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signaling connection and UE-associated services that are related to a single UE and are associated with a UE-associated signaling connection that is maintained for the UE. The E1AP services may include an E1 interface management function, an E1 bearer context management function and allocation of tunnel endpoint identifiers (TEIDs).

The F1 interface may be disposed between the CU 412 and the DU 414. The CU 412 may control the operation of the DU 414 over the F1 interface. As the signaling in the gNB is split into control plane and user plane signaling, the F1 interface may be split into the F1-C interface for control plane signaling and the F1-U interface for user plane signaling, which support control plane and user plane separation. The F1 interface, as above may separate the Radio Network and Transport Network Layers and enable exchange of UE associated information and non-UE associated information.

The F2 interface may be between the lower and upper parts of the NR PHY layer. The F2 interface may also be separated into F2-C and F2-U interfaces based on control plane and user plane functionalities.

Figure 5:
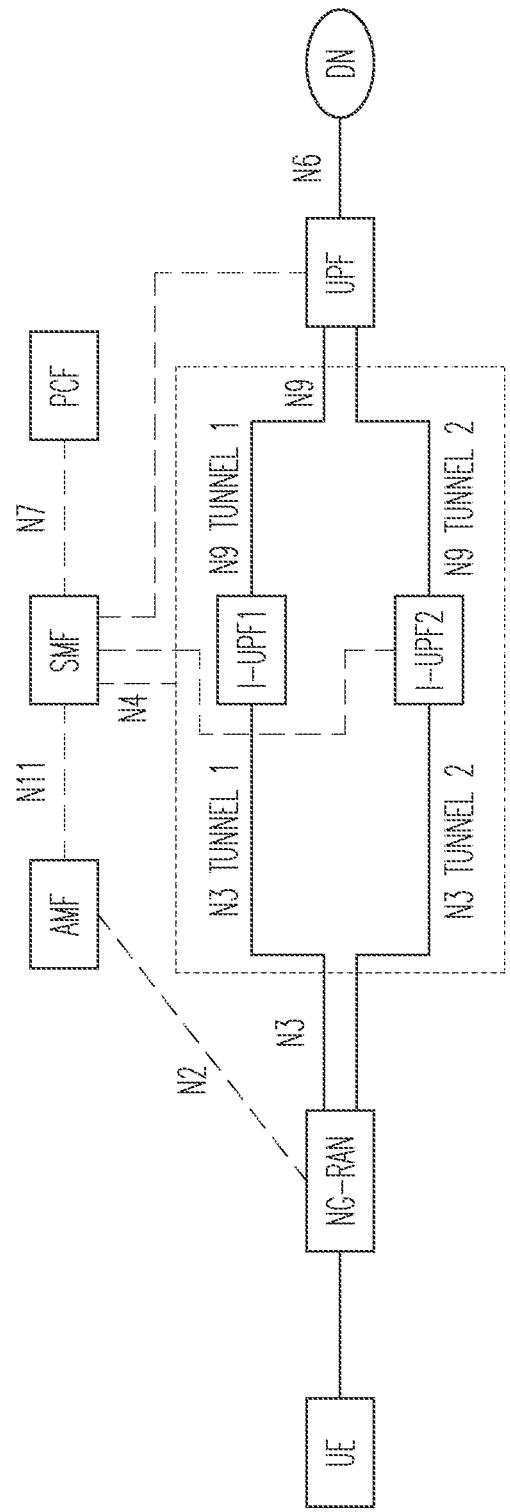
FIG. 5 illustrates user plane data delay in a 5G network in accordance with some embodiments.

FIG. 5 illustrates user plane data delay in a 5G network in accordance with some embodiments. The SMF can request to activation of QoS Monitoring for all UPFs and (R)ANs based on policies in the PCF. The SMF may send the QoS monitoring policy to each UPF and (R)AN via the N4 interface and via the N2 interface respectively.

A GPRS Tunneling Protocol for User-plane (GTP-U) sender may perform an estimation of round trip time (RTT) to a GTP-U receiver on a GTP-U path by sending Echo messages and measuring the time that elapses between the transmission of a request message and the reception of a response message in response to the request message. A GTP-U sender computes an accumulated packet delay by adding RTT/2, the processing time (of the UE) and, if available, an accumulated packet delay from an upstream GTP-U sender (e.g., an immediately preceding GTP-U sender in the user plane path). Thus, the measured accumulated delay represents an estimated elapsed time since a user plane packet entered the 3GPP domain.

A GTP-U sender may determine the RTT periodically to detect changes in transport delays. Specifically, the delay in the 5G network may be measured by different elements in the 5G network. The RAN may measure uplink/downlink (UL/DL) packet delay within the RAN (including, e.g., delays of the F1-U, Xn-U, and Uu interfaces for NR) and calculate the UL packet delay of the N3 interface. The RAN may provide the UL packet delay, which may include the packet delays of the RAN (including the aforementioned delays of the F1-U, Xn-U, Uu interfaces for NR) and the N3 interface towards the UPF.

The PSA UPF may calculate the UL/DL packet delay of the N3/N9 interface (the N9 interface is applicable when the intermediate UPF (I-UPF) exists). The UPF and RAN may report the QoS Monitoring result to the SMF based on a specific conditions, e.g., the first time, periodic, event triggered, or when thresholds for reporting towards SMF (via N4) are reached. The UPF performing the QoS monitoring can provide the corresponding {Network instance, Differentiated Services Code Point (DSCP)} along with the measured packet delay for the corresponding transport path to the SMF.

From management perspective, issues are to be addressed. Given that the measurements may be requested for all UPFs and (R)AN by the SMF based on policies, the QoS monitoring policy may be configurable on the SMF by the management system. The SMF may not receive all of the delay measurements, but just a subset which meets the specific conditions (e.g., threshold is reached). Thus, the management system may only collect the delay measurements from RAN and packet data unit (PDU) session anchor (PSA) UPF. To enable the measurement collection, the Management Function (where the Management Service producer is located) may instruct the SMF, (R)AN and/or UPF to perform the measurements and report accordingly based on the request from the consumer.

For the packet delay measured by the RAN, a number of measurements have been defined in 3GPP TS 28.552, herein incorporated by reference in its entirety: 5.1.1.1.1 Average delay the DL air-interface5.1, 5.1.3.3.1 Average delay DL in the CU-UP, 5.1.3.3.2 Average delay on the F1-U interface, 5.1.3.3.3 Average delay DL in the gNB-DU, and 5.1.3.4.2 IP Latency DL in the gNB-DU. These measurements are split into subcounter per 5G QoS Identifier (5QI)/QoS Class Identifier (QCI), i.e., measurements per 5QI and/or for QCI. However, among other issues the measurements are not counted per network slice (S-NSSAI), no measurements are defined on the UL delay, besides the average value, it would be beneficial to provide the delay distributions into bins with delay ranges, so that the measurement can tell the occurrences about the packets with each certain range of delay, and the measurements about the UL N3 delay is missing.

For a packet delay measured by PSA UPF, the round-trip GTP Data Packet Delay on the N3 interface is defined in 5.4.1.9 of 3GPP TS 28.552. However, it would be more beneficial to split this measurement into subcounters per DSCP, which can better reflect the performance related to the QoS flows. In addition, as the measurements are not for each S-NSSAI, so the performance pertinent to a network slice may be unable to be determined. Besides the average value, it would be beneficial to provide the delay distributions into bins with delay ranges, so that the measurement can tell the occurrences about the packets with each certain range of delay. The measurement on UPF internal delay (e.g., processing time) is also missing from the round-trip GTP Data Packet Delay. The measurements related to DL/UL delay on N9 are also missing (where I-UPF exists) from the round-trip GTP Data Packet Delay. The round-trip GTP Data Packet Delay does not differentiate for PSA UPF and I-UPF. In order to determine the end-to-end (e2e) delay between the UE and PSA UPF, the N3 may be differentiated for I-UPF and PSA-UPF. The performance measurements related to user plane data delay can be used to reflect the users' experience and optimize the delay performance when desired.

The bin sizes for the delay distributions can be determined based on the delay budget of the 5QI as shown in the table below, for instance for 5QI 1, a bin could be from 0-80 ms, 80 ms-100 ms, 100 ms-120 ms, or larger than 120 ms; for 5QI 86, a bin could be 0-4 ms, 4 ms-5 ms, 5 ms-6 ms, 6 ms-80 ms or bigger than 8 ms.

| 5QI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | $10^{-2}$ | N/A | 2000 ms | Conversational Voice |
| 2 | | 40 | 150 ms (NOTE 11, NOTE 13) | $10^{-3}$ | N/A | 2000 ms | Conversational Video (Live Streaming) |
| 3 (NOTE 14) | | 30 | 50 ms (NOTE 11, NOTE 13) | $10^{-3}$ | N/A | 2000 ms | Real Time Gaming, V2X messages Electricity distribution - medium voltage, Process automation - monitoring |
| 4 | | 50 | 300 ms (NOTE 11, NOTE 13) | $10^{-6}$ | N/A | 2000 ms | Non-Conversational Video (Buffered Streaming) |
| 65 (NOTE 9, NOTE 12) | | 7 | 75 ms (NOTE 7, NOTE 8) | $10^{-2}$ | N/A | 2000 ms | Mission Critical user plane Push To Talk voice (e.g., MCPTT) |
| 66 (NOTE 12) | | 20 | 100 ms (NOTE 10, NOTE 13) | $10^{-2}$ | N/A | 2000 ms | Non-Mission-Critical user plane Push To Talk voice |
| 67 (NOTE 12) | | 15 | 100 ms (NOTE 10, NOTE 13) | $10^{-3}$ | N/A | 2000 ms | Mission Critical Video user plane |
| 75 (NOTE 14) | | | | | | | |
| 71 | | 56 | 150 ms (NOTE 11, NOTE 13, NOTE 15) | $10^{-6}$ | N/A | 2000 ms | "Live" Uplink Streaming (e.g. TS 26.238 [76]) |
| 72 | | 56 | 300 ms (NOTE 11, NOTE 13, NOTE 15) | $10^{-4}$ | N/A | 2000 ms | "Live" Uplink Streaming (e.g. TS 26.238 [76]) |
| 73 | | 56 | 300 ms (NOTE 11, NOTE 13, NOTE 15) | $10^{-8}$ | N/A | 2000 ms | "Live" Uplink Streaming (e.g. TS 26.238 [76]) |
| 74 | | 56 | 500 ms (NOTE 11, NOTE 15) | $10^{-8}$ | N/A | 2000 ms | "Live" Uplink Streaming (e.g. TS 26.238 [76]) |
| 76 | | 56 | 500 ms (NOTE 11, NOTE 13, NOTE 15) | $10^{-4}$ | N/A | 2000 ms | "Live" Uplink Streaming (e.g. TS 26.238 [76]) |
| 5 | Non-GBR | 10 | 100 ms NOTE 10, NOTE 13) | $10^{-6}$ | N/A | N/A | IMS Signalling |
| 6 | (NOTE 1) | 60 | 300 ms (NOTE 10, NOTE 13) | $10^{-6}$ | N/A | N/A | Video (Buffered Streaming) TCP-based (e.g., www, e-mail, chat, ftp, p2p file sharing, progressive video, etc.) |
| 7 | | 70 | 100 ms (NOTE 10, NOTE 13) | $10^{-3}$ | N/A | N/A | Voice, Video (Live Streaming) Interactive Gaming |
| 8 | | 80 | 300 ms (NOTE 13) | $10^{-6}$ | N/A | N/A | Video (Buffered Streaming) TCP-based (e.g., www, e-mail, chat, ftp, p2p file sharing, progressive video, etc.) |
| 9 | | 90 | | | | | |

-continued

| 5QI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| 69 (NOTE 9, NOTE 12) | | 5 | 60 ms (NOTE 7, NOTE 8) | $10^{-6}$ | N/A | N/A | Mission Critical delay sensitive signalling (e.g., MC-PTT signalling) |
| 70 (NOTE 12) | | 55 | 200 ms (NOTE 7, NOTE 10) | $10^{-6}$ | N/A | N/A | Mission Critical Data (e.g. example services are the same as 5QI 6/8/9) |
| 79 | | 65 | 50 ms (NOTE 10, NOTE 13) | $10^{-2}$ | N/A | N/A | V2X messages |
| 80 | | 68 | 10 ms (NOTE 5, NOTE 10) | $10^{-6}$ | N/A | N/A | Low Latency eMBB applications Augmented Reality |
| 82 | Delay Critical GBR | 19 | 10 ms (NOTE 4) | $10^{-4}$ | 255 bytes | 2000 ms | Discrete Automation (see TS 22.261 [21]) |
| 83 | | 22 | 10 ms (NOTE 4) | $10^{-4}$ | 1354 bytes (NOTE 3) | 2000 ms | Discrete Automation (see TS 22.261 [2]); V2.X messages (UE - RSU Platooning, Advanced Driving, Cooperative Lane Change with low LoA. See TS 22.186 [111]) |
| 84 | | 24 | 30 ms (NOTE 6) | $10^{-5}$ | 1354 bytes (NOTE 3) | 2000 ms | Intelligent transport systems (see TS 22.261 [2]) |
| 85 | | 21 | 5 ms (NOTE 5) | $10^{-5}$ | 255 bytes | 2000 ms | Electricity Distribution-high voltage (see TS 22.261 [2]). V2X messages (Remote Driving. See TS 22.186 [111], NOTE 16) |
| 86 | | 18 | 5 ms (NOTE 5) | $10^{-4}$ | 1354 bytes | 2000 ms | V2X messages (Advanced Driving: Collision Avoidance, Platooning with high LoA. See TS 22.186 [111]) |

(NOTE 1):
A packet which is delayed more than PDB is not counted as lost, thus not included in the PER.
(NOTE 2):
it is required that default MDBV is supported by a PLMN supporting the related 5QIs.
(NOTE 3):
The Maximum Transfer Unit (MTU) size considerations in clause 9.3 and Annex C of TS 23.060 are also applicable. IP fragmentation may have impacts to CN PDB, and details are provided in clause 5.6.10.
(NOTE 4):
A static value for the CN PDB of 1 ms for the delay between a UPF terminating N6 and a 5G-AN should be subtracted from a given PDB to derive the packet delay budget that applies to the radio interface. When a dynamic CN PDB is used, see clause 5.7.3.4.
(NOTE 5):
A static value for the CN PDB of 2 ms for the delay between a UPF terminating N6 and a 5G-AN should be subtracted from a given PDB to derive the packet delay budget that applies to the radio interface. When a dynamic CN PDB is used, see clause 5.7.3.4.
(NOTE 6):

-continued

| 5QI Value | Resource Type | Default Priority Level | Packet Delay Budget (NOTE 3) | Packet Error Rate | Default Maximum Data Burst Volume (NOTE 2) | Default Averaging Window | Example Services |
| --- | --- | --- | --- | --- | --- | --- | --- |

A static value for the CN PDB of 5 ms for the delay between a UPF terminating N6 and a 5G-AN should be subtracted from a given PDB to derive the packet delay budget that applies to the radio interface. When a dynamic CN PDB is used, see clause 5.7.3.4.
(NOTE 7):
For Mission Critical services, it may be assumed that the UPF terminating N6 is located "close" to the 5G_AN (roughly 10 ms) and is not normally used in a long distance, home routed roaming situation. Hence a static value for the CN PDBof 10 ms for the delay between a UPF terminating N6 and a 5G_AN should be subtracted from this PDB to derive the packet delay budget that applies to the radio interface.
(NOTE 8):
In both RRC Idle and RRC Connected mode, the PDB requirement for these 5QIs can be relaxed (but not to a value greater than 320 ms) for the first packet(s) in a downlink data or signalling burst in order to permit reasonable battery saving (DRX) techniques.
(NOTE 9):
It is expected that 5QI-65 and 5QI-69 are used together to provide Mission Critical Push to Talk service (e.g., 5QI-5 is not used for signalling). It is expected that the amount of traffic per UE will be similar or less compared to the IMS signalling.
(NOTE 10):
In both RRC Idle and RRC Connected mode, the PDB requirement for these 5QIs can be relaxed for the first packet(s) in a downlink data or signalling burst in order to permit battery saving (DRX) techniques.
(NOTE 11):
In RRC Idle mode, the PDB requirement for these 5QIs can be relaxed for the first packet(s) in a downlink data or signalling burst in order to permit battery saving (DRX) techniques.
(NOTE 12):
This 5QI value can only be assigned upon request from the network side. The UE and any application running on the UE is not allowed to request this 5QI value.
(NOTE 13):
A static value for the CN PDB of 20 ms for the delay between a UPF terminating N6 and a 5G-AN should be subtracted from a given PDB to derive the packet delay budget that applies to the radio interface.
(NOTE 14):
This 5QI is not supported in this Release of the specification as it is only used for transmission of V2X messages over MBMS bearers as defined in TS 23.285 but the value is reserved for future use.
(NOTE 15):
For "live" uplink streaming (see TS 26.238), guidelines for PDB values of the different 5QIs correspond to the latency configurations defined in TR 26.939. In order to support higher latency reliable streaming services (above 500 ms PDB), if different PDB and PER combinations are needed these configurations will have to use non-standardised 5QIs.
(NOTE 16):
These services are expected to need much larger MDBV values to be signalled to the RAN. Support for such larger MDBV values with low latency and high reliability is likely to require a suitable RAN configuration, for which, the simulation scenarios in TR 38.824 may contain some guidance.

Figure 6A:
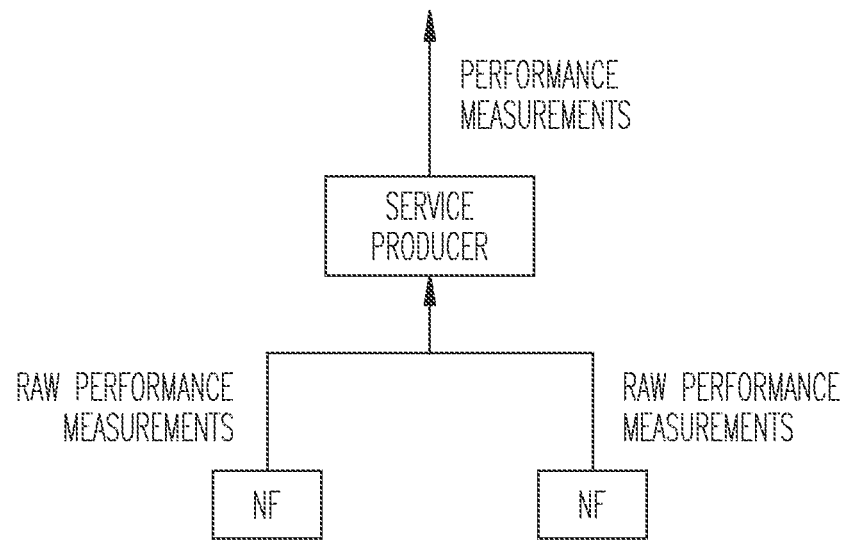
FIG. 6A illustrates generation of network function (NF) performance measurements in accordance with some embodiments.
Figure 6B:
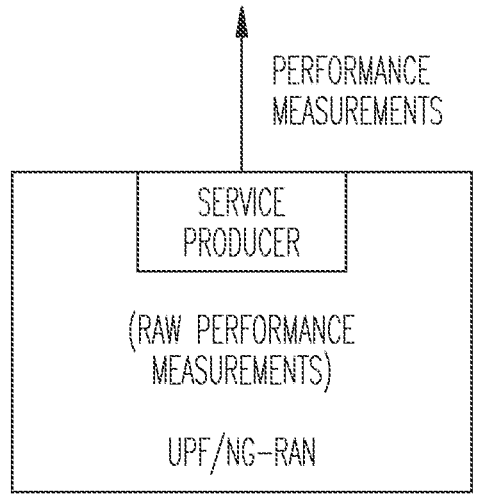
FIG. 6B illustrates generation of performance measurements for a user plane function (UPF) or next-generation radio access network (NG-RAN) in accordance with some embodiments.

FIG. 6A illustrates generation of NF performance measurements in accordance with some embodiments. As shown, a service producer may collect the raw performance measurements from NFs, and then generate the performance measurements for NFs for its consumers. Specifically, the NF may be UPF or gNB (or gNB CU-UP and gNB-DU), and the service producer may be implemented in a separate management system. FIG. 6B illustrates generation of performance measurements for a UPF or NG-RAN in accordance with some embodiments. That is, the NF shown in FIG. 6A may be either a UP or an NG-RAN, as shown in FIG. 6B. In FIG. 6B, the service producer may be implemented within the NF. The service producer may combine one or sets of the raw performance measurements from one or more NFs to produce the desired performance measurements. The raw performance measurements may thus be obtained occur at the same frequency as or more frequently than determination/transmission of the performance measurements.

Performance measurements may be defined in 3GPP TS 28.552 as:

5.1.1.1 Packet Delay in 3GPP TS 28.552.

5.1.1.1.1 Average Delay DL Air-Interface in 3GPP TS 28.552.

a) This measurement provides the average (arithmetic mean) time it takes to get a response back on a Hybrid Automatic Repeat Request (HARQ) transmission in the downlink direction. The measurement is optionally split into subcounters per QoS level (mapped 5QI or QCI in NR option 3) and subcounters per S-NSSAI.

b) Detection Error Rate (DER) (n=1)

c) This measurement may be obtained as: the sum of (the time when the last part of a radio link control (RLC) Service Data Unit (SDU) packet was received by the UE according to received HARQ feedback information, minus time when the last part of the same packet was transmitted over the air) divided by total number of RLC SDUs arriving at the Medium Access Control (MAC) lower Service Access Point (SAP). If the RLC SDU is to be retransmitted (for Acknowledged Mode), the delay may still include only one contribution (the original one) to this measurement. Separate counters are optionally maintained for each mapped 5QI (or QCI for option 3) and for each S-NSSAI.

d) Each measurement is an integer representing the mean delay in microseconds. The number of measurements is equal to one. If the optional QoS level measurement is performed, the number of measurements is equal to the number of mapped 5QIs.

e) The measurement name has the form DRB.AirIfDelayD1, or DRB.AirIfDelayD1QoS.QOS, where QOS identifies the target quality of service class, or DRB.AirIfDelayD1Snssai.SNSSAI, where SNSSAI identifies the S-NSSAI.

f) NRCellDU g) Valid for packet switched traffic h) 5GS i) One usage of this measurement is for performance assurance within integrity area (user plane connection quality).

5.1.1.1.x Distribution of Delay DL Air-Interface a) This measurement provides the distribution of the time it takes to get a response back on a HARQ transmission in the downlink direction. The measurement is split into subcounters per QoS level (mapped 5QI or QCI in NR option 3) and subcounters per S-NSSAI.

b) DER (n=1)

c) This measurement may be obtained by 1) calculating the DL delay for an RLC SDU packet by: the time when the last part of an RLC SDU packet was received by the UE according to received HARQ feedback information, minus the time when the last part of the same packet was transmitted over the air; and 2) incrementing the corresponding bin with the delay range where the result of 1) falls into by 1 for the subcounters per QoS level (mapped 5QI or QCI in NR option 3) and subcounters per S-NSSAI. If retransmission of the RLC SDU occurs (for Acknowledged Mode), the delay may still include only one contribution (the original one) to this measurement.

d) Each measurement is an integer representing the number of RLC SDU packets measured with the delay within the range of the bin.

e) DRB.AirIfDelayDistQoS.Bin.QOS, where QOS identifies the target quality of service class, and Bin indicates a delay range which is vendor specific; DRB.AirIfDelayDist-Snssai.Bin.SNSSI, where SNSSAI identifies the S-NSSAI, and Bin indicates a delay range which is vendor specific.

f) NRCellDU g) Valid for packet switched traffic h) 5GS i) One usage of this measurement is for performance assurance within integrity area (user plane connection quality).

5.1.3.3 Packet Delay 5.1.3.3.1 Average Delay DL in CU-UP a) This measurement provides the average (arithmetic mean) PDCP SDU delay on the downlink within the gNB-CU-UP, for all PDCP packets. The measurement is optionally split into subcounters per QoS level (mapped 5QI or QCI in NR option 3) and subcounters per S-NSSAI.

b) DER (n=1)

c) This measurement may be obtained as: sum of (time when sending a PDCP SDU to the gNB-DU at the egress PDCP layer on F1-U-Xn-U, minus time of arrival of the same packet at NG-U ingress IP termination) divided by total number of PDCP SDUs arriving at NG-U ingress IP termination. Separate counters are optionally maintained for each mapped 5QI (or QCI for option 3) and for each S-NSSAI.

d) Each measurement is an integer representing the mean delay in microseconds. The number of measurements is equal to one. If the optional QoS level measurement is performed, the number of measurements is equal to the number of mapped 5QIs.

e) The measurement name has the form DRB.PdcpSduDelayD1, or DRB.PdcpSduDelayD1QoS.QOS where QOS identifies the target quality of service class, or DRB.PdcpSduDelayD1Snssai.SNSSAI, where SNSSAI identifies the S-NSSAI.

f) GNBCUUPFunction g) Valid for packet switched traffic h) 5GS i) One usage of this measurement is for performance assurance within integrity area (user plane connection quality).

5.1.3.3.2 Average Delay DL on F1-U a) This measurement provides the average (arithmetic mean) GTP packet delay DL on the F1-U interface. The measurement is optionally split into subcounters per QoS level (mapped 5QI or QCI in NR option 3) and subcounters per S-NSSAI.

b) DER (n=1)

c) This measurement may be obtained as: the time when receiving a GTP packet delivery status message from the gNB-DU at the egress GTP termination, minus time when sending the same packet to gNB-DU at the GTP ingress termination, minus feedback delay time in gNB-DU, obtained result is divided by two. Separate counters are optionally maintained for each mapped 5QI (or QCI for option 3) and for each S-NSSAI.

d) Each measurement is an integer representing the mean delay in microseconds. The number of measurements is equal to one. If the optional QoS level measurement is performed, the number of measurements is equal to the number of mapped 5QIs.

e) The measurement name has the form DRB.PdcpF1Delay, or DRB.GtpF1DelayD1QoS.QOS where QOS identifies the target quality of service, or DRB.GtpF1DelayD1Snssai.SNSSAI, where SNSSAI identifies the S-NSSAI.

f) GNBCUUPFunction g) Valid for packet switched traffic h) 5GS i) One usage of this measurement is for performance assurance within integrity area (user plane connection quality).

5.1.3.3.3 Average Delay DL in gNB-DU a) This measurement provides the average (arithmetic mean) RLC SDU delay on the downlink within the gNB-DU, for initial transmission of all RLC packets. The measurement is optionally split into subcounters per QoS level (mapped 5QI or QCI in NR option 3) and subcounters per S-NSSAI.

b) DER (n=1)

c) This measurement may be obtained as: sum of (time when the last part of an RLC SDU was scheduled and sent to the MAC layer for transmission over the air, minus time of arrival of the same packet at the RLC ingress F1-U termination) divided by total number of RLC SDUs arriving at the RLC ingress F1-U termination. If the Retransmission of the RLC SDU is to occur (for Acknowledged Mode) the delay will still include only one contribution (the original one) to this measurement. Separate counters are optionally maintained for each mapped 5QI (or QCI for option 3) and for each S-NSSAI. Each measurement is an integer representing the mean delay in microseconds.

d) The number of measurements is equal to one. If the optional QoS level measurement is performed, the number of measurements is equal to the number of mapped 5QIs.

e) The measurement name has the form DRB.R1cSduDelayD1, or DRB.R1cSduDelayD1QoS.QOS where QOS identifies the target quality of service class, or DRB.R1cSduDelayD1Snssai.SNSSAI, where SNSSAI identifies the S-NSSAI.

f) NRCellDU.

g) Valid for packet switched traffic.

h) 5GS.

i) One usage of this measurement is for performance assurance within integrity area (user plane connection quality).

5.1.3.3.x Distribution of Delay DL in CU-UP a) This measurement provides the distribution of PDCP SDU delay on the downlink within the gNB-CU-UP, for all PDCP packets. The measurement is split into subcounters per QoS level (mapped 5QI or QCI in NR option 3) and subcounters per S-NSSAI.

b) DER (n=1)

c) This measurement may be obtained by 1) calculating the DL delay within the gNB-CU-UP for a PDCP SDU packet by: the time when sending a PDCP SDU to the gNB-DU at the egress PDCP layer on F1-U/Xn-U, minus time of arrival of the same packet at NG-U ingress IP termination; and 2) incrementing the corresponding bin with the delay range where the result of 1) falls into by 1 for the subcounters per QoS level (mapped 5QI or QCI in NR option 3) and subcounters per S-NSSAI.

d) Each measurement is an integer representing the number of PDCP SDU packets measured with the delay within the range of the bin.

e) DRB.PdcpSduDelayD1DistQoS.Bin.QOS, where QOS identifies the target quality of service class, and Bin indicates a delay range which is vendor specific; DRB.PdcpSduDelayD1DistSnssai.Bin.SNSSAI, where SNSSAI identifies the S-NSSAI, and Bin indicates a delay range which is vendor specific.

f) GNBCUUPFunction g) Valid for packet switched traffic h) 5GS i) One usage of this measurement is for performance assurance within integrity area (user plane connection quality).

5.1.3.3.y Distribution of Delay DL on F1-U a) This measurement provides the distribution of GTP packet delay DL on the F1-U interface. The measurement is split into subcounters per QoS level (mapped 5QI or QCI in NR option 3) and subcounters per S-NSSAI.

b) DER (n=1)

c) This measurement may be obtained by 1) calculating the DL delay on F1-U for a GTP packet by: the time when receiving a GTP packet delivery status message from the gNB-DU at the egress GTP termination, minus time when sending the same packet to gNB-DU at the GTP ingress termination, minus feedback delay time in gNB-DU, obtained result is divided by two; and 2) incrementing the corresponding bin with the delay range where the result of 1) falls into by 1 for the subcounters per QoS level (mapped 5QI or QCI in NR option 3) and subcounters per S-NSSAI.

d) Each measurement is an integer representing the number of GTP packets measured with the delay within the range of the bin.

e) DRB.GtpF1DelayD1DistQoS.QOS where QOS identifies the target quality of service class, and Bin indicates a delay range which is vendor specific; DRB.GtpF1DelayD1DistSnssai.SNSSAI, where SNSSAI identifies the S-NSSAI, and Bin indicates a delay range which is vendor specific.

f) GNBCUUPFunction g) Valid for packet switched traffic h) 5GS i) One usage of this measurement is for performance assurance within integrity area (user plane connection quality).

5.1.3.3.z Distribution of Delay DL in gNB-DU a) This measurement provides the distribution of RLC SDU delay on the downlink within the gNB-DU, for initial transmission of all RLC packets. The measurement is split into subcounters per QoS level (mapped 5QI or QCI in NR option 3) and subcounters per S-NSSAI.

b) DER (n=1)

c) This measurement may be obtained by 1) calculating the delay on the downlink within the gNB-DU for a RLC SDU packet by: the time when the last part of an RLC SDU was scheduled and sent to the MAC layer for transmission over the air, minus time of arrival of the same packet at the RLC ingress F1-U termination; and 2) incrementing the corresponding bin with the delay range where the result of 1) falls into by 1 for the subcounters per QoS level (mapped 5QI or QCI in NR option 3) and subcounters per S-NSSAI. If retransmission of the RLC SDU is to occur (for Acknowledged Mode) the delay will still include only one contribution (the original one) to this measurement.

d) Each measurement is an integer representing the number of RLC SDU packets measured with the delay within the range of the bin.

e) DRB.R1cSduDelayD1DistQoS.QOS, where QOS identifies the target quality of service class, and Bin indicates a delay range which is vendor specific; DRB.R1cSduDelayD1DistSnssai.SNSSAI, where SNSSAI identifies the S-NSSAI, and Bin indicates a delay range which is vendor specifics.

f) NRCellDU g) Valid for packet switched traffic h) 5GS i) One usage of this measurement is for performance assurance within integrity area (user plane connection quality).

5.1.3.4 IP Latency Measurements 5.1.3.4.1 General Information

This subclause defines the DL latency in gNB-DU. DL latency measurements for CU-UP and F1-U are not defined.

5.1.3.4.2 Average IP Latency DL in gNB-DU a) This measurement provides the average IP Latency in DL (arithmetic mean) within the gNB-DU, when there is no other prior data to be transmitted to the same UE in the gNB-DU. The measurement is optionally split into subcounters per QoS level and subcounters per S-NSSAI.

b) DER (n=1)

c) This measurement may be obtained as: sum of (time when the first piece of an RLC SDU transmitted on the air interface, minus time of arrival of the same packet at the RLC ingress F1-U termination, for IP packets arriving when there is no other prior data to be transmitted to the same UE in the gNB-DU) divided by total number of RLC SDUs arriving at the RLC ingress F1-U termination when there is no other prior data to be transmitted to the same UE in the gNB-DU. Separate counters are optionally maintained for each mapped 5QI (or QCI for option 3) and for each S-NSSAI.

d) Each measurement is an integer representing the average latency in microseconds. The number of measurements is equal to one. If the optional QoS level measurement is performed, the number of measurements is equal to the number of supported mapped 5QIs.

e) The measurement name has the form DRB.R1cSduLatencyD1, or DRB.R1cSduLatencyD1QoS.QOS where QOS identifies the target quality of service class, or DRB.R1cSduLatencyD1Snssai.SNSSAI, where SNSSAI identifies the S-NSSAI.

f) NRCellDU g) Valid for packet switched traffic h) 5GS i) One usage of this measurement is for performance assurance within integrity area (user plane connection quality).

5.1.3.4.x Distribution of IP Latency DL in gNB-DU a) This measurement provides the distribution of IP Latency in DL within the gNB-DU, when there is no other prior data to be transmitted to the same UE in the gNB-DU. The measurement is split into subcounters per QoS level and subcounters per S-NSSAI.

b) DER (n=1)

c) This measurement may be obtained by 1) calculating the latency on the downlink within the gNB-DU for a RLC SDU packet by: time when the first piece of an RLC SDU transmitted on the air interface, minus time of arrival of the same packet at the RLC ingress F1-U termination, for IP packets arriving when there is no other prior data to be transmitted to the same UE in the gNB-DU; and 2) incrementing the corresponding bin with the latency range where the result of 1) falls into by 1 for the subcounters per QoS level (mapped 5QI or QCI in NR option 3) and subcounters per S-NSSAI.

d) Each measurement is an integer representing the number of RLC SDU packets measured with the latency within the range of the bin.

e) DRB.R1cSduLatencyD1DistQoS.QOS, where QOS identifies the target quality of service class, and Bin indicates a latency range which is vendor specific; DRB.R1cSduLatencyD1DistSnssai.SNSSAI, where SNSSAI identifies the S-NSSAI, and Bin indicates a latency range which is vendor specifics.

f) NRCellDU g) Valid for packet switched traffic h) 5GS i) One usage of this measurement is for performance assurance within integrity area (user plane connection quality).

5.1.1.1.x Average Round-Trip N3 Delay for UL GTP Packets a) This measurement provides the average round-trip delay on a N3 interface for UL GTP packets. This measurement is split into subcounters per DSCP.

b) DER (n=1).

c) This measurement may be obtained as: sum of (time when receiving a GTP echo reply message from the UPF at gNB CU-UP's ingress GTP termination, minus time when sending the associated echo request message to the UPF at the gNB CU-UP's GTP egress termination) divided by total number of GTP echo reply message received at gNB CU-UP's ingress GTP termination. This measurement is calculated for each DSCP.

d) Each measurement is a real representing the average delay in microseconds.

e) The measurement name has the form GTP.RttDelayN3UlMean.DSCP where DSCP identifies the DSCP.

f) EP_N3 (contained by GNBCUUPFunction).

g) Valid for packet switched traffic.

h) 5GS.

5.1.1.1.y Distribution of Round-Trip N3 Delay for UL GTP Packets a) This measurement provides the distribution of round-trip delay on a N3 interface for UL GTP packets. This measurement is split into subcounters per DSCP.

b) DER (n=1).

c) This measurement may be obtained by 1) calculating the RTT N3 delay for a UL GTP packet by: the time when receiving a GTP echo reply message from the UPF at gNB CU-UP's ingress GTP termination, minus time when sending the associated echo request message to the UPF at the gNB CU-UP's GTP egress termination; and 2) incrementing the corresponding bin with the delay range where the result of 1) falls into by 1 for the subcounters per DSCP.

d) Each measurement is an integer representing the number of GTO echo messages measured with the delay within the range of the bin.

e) The measurement name has the form GTP.RttDelayN3U1Dist.DSCP where DSCP identifies the DSCP.

f) EP_N3 (contained by GNBCUUPFunction).

g) Valid for packet switched traffic.

h) 5GS.

5.4.1.9 Round-Trip GTP Data Packet Delay 5.4.1.9.1 Average Round-Trip N3 Delay for DL GTP Packets on PSA UPF a) This measurement provides the average round-trip delay on a N3 interface for DL GTP packets on PSA UPF. This measurement is split into subcounters per DSCP.

b) DER (n=1).

c) This measurement may be obtained as: the sum (the time when receiving a GTP echo reply message from the gNB-CU-UP at PSA UPF's ingress GTP termination, minus time when sending the associated echo request message to gNB-CU-UP at the PSA UPF's GTP egress termination) divided by total number of GTP echo reply message received at PSA UPF's ingress GTP termination. This measurement is calculated for each DSCP.

d) Each measurement is a real representing the average delay in microseconds.

e) The measurement name has the form GTP.RttDelayN3D1PsaUpfMean.DSCP where DSCP identifies the DSCP.

f) EP_N3 (contained by UPFFunction).

g) Valid for packet switched traffic.

h) 5GS.

5.4.1.9.x Distribution of Round-Trip N3 Delay for DL GTP Packets on PSA UPF a) This measurement provides the distribution of delay on a N3 interface for DL GTP packets on PSA UPF. This measurement is split into subcounters per DSCP.

b) DER (n=1).

c) This measurement may be obtained by 1) calculating the RTT N3 delay for a DL GTP packet by: the time when receiving a GTP echo reply message from the gNB-CU-UP at PSA UPF's ingress GTP termination, minus time when sending the associated echo request message to gNB-CU-UP at the PSA UPF's GTP egress termination; and 2) incrementing the corresponding bin with the delay range where the result of 1) falls into by 1 for the subcounters per DSCP.

d) Each measurement is an integer representing the number of GTP echo messages measured with the delay within the range of the bin.

e) The measurement name has the form GTP.RttDelayN3D1PsaUpfDist.Bin.DSCP where Bin indicates a delay range which is vendor specific, and DSCP identifies the DSCP.

f) EP_N3 (contained by UPFFunction).

g) Valid for packet switched traffic.

h) 5GS.

5.4.1.9.y Average Round-Trip N3 Delay for DL GTP Packets on I-UPF a) This measurement provides the average round-trip delay on a N3 interface for DL GTP packets on I-UPF. This measurement is split into subcounters per DSCP.

b) DER (n=1).

c) This measurement may be obtained as: the sum (the time when receiving a GTP echo reply message from the gNB-DU at I-UPF's ingress GTP termination, minus time when sending the associated echo request message to gNB-DU at the I-UPF's GTP egress termination) divided by total number of GTP echo reply message received at I-UPF's ingress GTP termination. This measurement is calculated for each DSCP.

d) Each measurement is a real representing the average delay in microseconds.

e) The measurement name has the form GTP.RttDelayN3D1IUpfMean.DSCP where DSCP identifies the DSCP.

f) EP_N3 (contained by UPFFunction).

g) Valid for packet switched traffic.

h) 5GS.

5.4.1.9.z Distribution of Round-Trip N3 Delay for DL GTP Packets on I-UPF a) This measurement provides the distribution of delay on a N3 interface for DL GTP packets on I-UPF. This measurement is split into subcounters per DSCP.

b) DER (n=1).

c) This measurement may be obtained by 1) calculating the RTT N3 delay for a DL GTP packet by: the time when receiving a GTP echo reply message from the gNB-DU at I-UPF's ingress GTP termination, minus time when sending the associated echo request message to gNB-DU at the I-UPF's GTP egress termination; and 2) incrementing the corresponding bin with the delay range where the result of 1) falls into by 1 for the subcounters per DSCP.

d) Each measurement is an integer representing the number of GTP echo messages measured with the delay within the range of the bin.

e) The measurement name has the form GTP.RttDelayN3D1IUpfsDist.Bin.DSCP where Bin indicates a delay range which is vendor specific, and DSCP identifies the DSCP.

f) EP_N3 (contained by UPFFunction).

g) Valid for packet switched traffic.

h) 5GS.

5.4.x N9 Interface Related Measurements 5.4.x.1 Round-Trip GTP Data Packet Delay on N9 Interface 5.4.x.1.1 Average Round-Trip N9 Delay for DL GTP Packets on PSA UPF a) This measurement provides the average round-trip delay on a N9 interface for DL GTP packets on PSA UPF. This measurement is split into subcounters per DSCP.

b) DER (n=1).

c) This measurement may be obtained as: the sum (the time when receiving a GTP echo reply message from the I-UPF at PSA UPF's ingress GTP termination, minus time when sending the associated echo request message to I-UPF at the PSA UPF's GTP egress termination) divided by total number of GTP echo reply message received at PSA UPF's ingress GTP termination. This measurement is calculated for each DSCP.

d) Each measurement is a real representing the average delay in microseconds.

e) The measurement name has the form GTP.RttDelayN9D1PsaUpfMean.DSCP where DSCP identifies the DSCP.

f) EP_N9.

g) Valid for packet switched traffic.

h) 5GS.

5.4.x.1.2 Distribution of Round-Trip N9 Delay for DL GTP Packets on PSA UPF a) This measurement provides the distribution of delay on a N9 interface for DL GTP packets on PSA UPF. This measurement is split into subcounters per DSCP.

b) DER (n=)

c) This measurement may be obtained by 1) calculating the RTT N9 delay for a DL GTP packet by: the time when receiving a GTP echo reply message from the I-UPF at PSA UPF's ingress GTP termination, minus time when sending the associated echo request message to I-UPF at the PSA UPF's GTP egress termination; and 2) incrementing the corresponding bin with the delay range where the result of 1) falls into by 1 for the subcounters per DSCP.

d) Each measurement is an integer representing the number of GTP echo messages measured with the delay within the range of the bin.

e) The measurement name has the form GTP.RttDelayN9D1PsaUpfDist.Bin.DSCP where Bin indicates a delay range which is vendor specific, and DSCP identifies the DSCP.

f) EP_N9.

g) Valid for packet switched traffic.

h) 5GS.

5.4.x.1.3 Average Round-Trip N9 Delay for UL GIP Packets on I-UPF a) This measurement provides the average round-trip delay on a N9 interface for UL GTP packets on I-UPF. This measurement is split into subcounters per DSCP.

b) DER (n=1).

c) This measurement may be obtained as: the sum (the time when receiving a GTP echo reply message from the PSA UPF at I-UPF's ingress GTP termination, minus time when sending the associated echo request message to PSA UPF at the I-UPF's GTP egress termination) divided by total number of GTP echo reply message received at I-UPF's ingress GTP termination. This measurement is calculated for each DSCP.

d) Each measurement is a real representing the average delay in microseconds.

e) The measurement name has the form GTP.RttDelayN9U1IUpfMean.DSCP where DSCP identifies the DSCP.

f) EP_N9.

g) Valid for packet switched traffic.

h) 5GS.

5.4.x.1.4 Distribution of Round-Trip N9 Delay for UL GTP Packets on I-UPF a) This measurement provides the distribution of delay on a N9 interface for UL GTP packets on I-UPF. This measurement is split into subcounters per DSCP.

b) DER (n=1).

c) This measurement may be obtained by 1) calculating the RTT N9 delay for a UL GTP packet by: the time when receiving a GTP echo reply message from the PSA UPF at I-UPF's ingress GTP termination, minus time when sending the associated echo request message to PSA UPF at the I-UPF's GTP egress termination; and 2) incrementing the corresponding bin with the delay range where the result of 1) falls into by 1 for the subcounters per DSCP.

d) Each measurement is an integer representing the number of GTP echo messages measured with the delay within the range of the bin.

e) The measurement name has the form GTP.RttDelayN9U1IUpfDist.Bin.DSCP where Bin indicates a delay range which is vendor specific, and DSCP identifies the DSCP.

f) EP_N9.

g) Valid for packet switched traffic.

h) 5GS.

5.4.y GTP Packets Delay in UPF 5.4.y.1 DL GTP Packets Delay in UPF 5.4.y.1.1 Average DL GTP Packets Delay in PSA UPF a) This measurement provides the average (arithmetic mean) DL GTP packets delay within the PSA UPF. The measurement is split into subcounters per 5QI and subcounters per S-NSSAI.

b) DER (n=1).

c) This measurement may be obtained as: sum of (time when sending a DL GTP PDU to the gNB-CU-UP or I-UPF at the PSA UPF's egress GTP termination, minus time of arrival of the same packet at PSA UPF's ingress IP termination for N6 interface) divided by total number of DL GTP PDUs sent to the gNB-CU-UP or I-UPF. The measurement is calculated per 5QI and per S-NSSAI.

d) Each measurement is an integer representing the mean delay in microseconds.

e) GTP.DelayD1InPsaUpfMeanQoS.5QI, where 5QI identifies the 5QI; GTP.Delay D1InPsaUpfMeanSnssai.SNSSAI, where SNSSAI identifies the S-NSSAI f) UPFFunction.

g) Valid for packet switched traffic.

h) 5GS.

5.4.y.1.2 Distribution of DL GTP Packets Delay in PSA UPF a) This measurement provides the distribution of DL GTP packets delay within the PSA UPF. The measurement is split into subcounters per 5QI and subcounters per S-NSSAI.

b) DER (n=1).

c) This measurement may be obtained by 1) calculating the DL delay for a GTP PDU in PSA UPF by: time when sending a DL GTP PDU to the gNB-CU-UP or I-UPF at the PSA UPF's egress GTP termination, minus time of arrival of the same packet at PSA UPF's ingress IP termination for N6 interface; and 2) incrementing the corresponding bin with the delay range where the result of 1) falls into by 1 for the subcounters per 5QI and subcounters per S-NSSAI.

d) Each measurement is an integer representing the number of DL GTP PDUs measured with the delay within the range of the bin.

e) GTP.DelayD1InPsaUpfDistQoS.Bin.5QI, where Bin indicates a delay range which is vendor specific, and 5QI identifies the 5QI; GTP.DelayD1InPsaUpfDistSnssai.Bin.SNSSAI, where Bin indicates a delay range which is vendor specific, and SNSSAI identifies the S-NSSAI.

f) UPFFunction.

g) Valid for packet switched traffic.

h) 5GS.

5.4.y.1.3 Average DL GTP Packets Delay in I-UPF a) This measurement provides the average (arithmetic mean) DL GTP packets delay within the I-UPF. The measurement is split into subcounters per 5QI and subcounters per S-NSSAI.

b) DER (n=1).

c) This measurement may be obtained as: sum of (time when sending a DL GTP PDU to the gNB-CU-UP at the I-UPF's egress GTP termination, minus time of arrival of the same packet at I-UPF's ingress GTP termination for N9 interface) divided by total number of DL GTP PDUs sent to the gNB-CU-UP. The measurement is calculated per 5QI and per S-NSSAI.

d) Each measurement is an integer representing the mean delay in microseconds.

e) GTP.DelayD1InIUpfMeanQoS.5QI, where 5QI identifies the 5QI; GTP.DelayD1InIUpfMeanSnssai.SNSSAI, where SNSSAI identifies the S-NSSAI.

f) UPFFunction.

g) Valid for packet switched traffic.

h) 5GS.

5.4.y.1.4 Distribution of DL GTP Packets Delay in I-UPF a) This measurement provides the distribution of DL GTP packets delay within the I-UPF. The measurement is split into subcounters per 5QI and subcounters per S-NSSAI.

b) DER (n=1).

c) This measurement may be obtained by 1) calculating the DL delay for a GTP PDU in I-UPF by: time when sending a DL GTP PDU to the gNB-CU-UP at the I-UPF's egress GTP termination, minus time of arrival of the same packet at I-UPF's ingress GTP termination for N9 interface; and 2) incrementing the corresponding bin with the delay range where the result of 1) falls into by 1 for the subcounters per 5QI and subcounters per S-NSSAI.

d) Each measurement is an integer representing the number of DL GTP PDUs measured with the delay within the range of the bin.

e) GTP.DelayD1InIUpfDistQoS. Bin 5QI, where Bin indicates a delay range which is vendor specific, and 5QI identifies the 5QI; GTP.Delay D1InIUpfDistSnssai.Bin.SNSSAI, where Bin indicates a delay range which is vendor specific, and SNSSAI identifies the S-NSSAI.

f) UPFFunction.

g) Valid for packet switched traffic.

h) 5GS.

5.4.y.2 UL GTP Packets Delay in UPF 5.4.y.2.1 Average UL GTP Packets Delay in PSA UPF a) This measurement provides the average (arithmetic mean) UL GTP packets delay within the PSA UPF. The measurement is split into subcounters per 5QI and subcounters per S-NSSAI.

b) DER (n=1).

c) This measurement may be obtained as: sum of (time when sending a UL data packet at the PSA UPF's egress IP termination for N6 interface, minus time of arrival of the corresponding GTP SDU from N3 or N9 interface at PSA UPF's ingress GTP termination) divided by total number of UL data packets sent to N6 interface. The measurement is calculated per 5QI and per S-NSSAI.

d) Each measurement is an integer representing the mean delay in microseconds.

e) GTP.DelayU1InPsaUpfMeanQoS.5QI, where 5QI identifies the 5QI; GTP.DelayU1InPsaUpfMeanSnssai.SNSSAI, where SNSSAI identifies the S-NSSAI.

f) UPFFunction.

g) Valid for packet switched traffic.

h) 5GS.

5.4.y.2.2 Distribution of UL GTP Packets Delay in PSA UPF a) This measurement provides the distribution of UL GTP packets delay within the PSA UPF. The measurement is split into subcounters per 5QI and subcounters per S-NSSAI.

b) DER (n=1).

c) This measurement may be obtained by 1) calculating the UL delay for a GTP PDU in the PSA UPF by: time when sending a UL data packet at the PSA UPF's egress IP termination for N6 interface, minus time of arrival of the corresponding GTP SDU from N3 or N9 interface at PSA UPF's ingress GTP termination; and 2) incrementing the corresponding bin with the delay range where the result of 1) falls into by 1 for the subcounters per 5QI and subcounters per S-NSSAI.

d) Each measurement is an integer representing the number of UL GTP PDUs measured with the delay within the range of the bin.

e) GTP.DelayU1InPsaUpfDistQoS.Bin.5QI, where Bin indicates a delay range which is vendor specific, and 5QI identifies the 5QI; GTP.DelayU1InPsaUpfDistSnssai.Bin.SNSSAI, where Bin indicates a delay range which is vendor specific, and SNSSAI identifies the S-NSSAI.

f) UPFFunction.
g) Valid for packet switched traffic.
h) 5GS.

5.4.y.2.3 Average UL GTP Packets Delay in I-UPF a) This measurement provides the average (arithmetic mean) UL GTP packets delay within the I-UPF. The measurement is split into subcounters per 5QI and subcounters per S-NSSAI.

b) DER (n=1).

c) This measurement may be obtained as: sum of (time when sending a UL GTP PDU to the PSA UPF at the I-UPF's egress GTP termination, minus time of arrival of the same packet from N3 interface at I-UPF's ingress GTP termination) divided by total number of UL GTP PDUs sent to the PSA UPF. The measurement is calculated per 5QI and per S-NSSAI.

d) Each measurement is an integer representing the mean delay in microseconds.

e) GTP.DelayU1InIUpfMeanQoS.5QI, where 5QI identifies the 5QI; GTP.DelayU1InIUpfMeanSnssai.SNSSAI, where SNSSAI identifies the S-NSSAI.

f) UPFFunction.
g) Valid for packet switched traffic.
h) 5GS.

5.4.y.2.4 Distribution of UL GTP Packets Delay in I-UPF a) This measurement provides the distribution of UL GTP packets delay within the I-UPF. The measurement is split into subcounters per 5QI and subcounters per S-NSSAI.

b) DER (n=1).

c) This measurement may be obtained by 1) calculating the UL delay for a GTP PDU in I-UPF by: time when sending a UL GTP PDU to the PSA UPF at the I-UPF's egress GTP termination, minus time of arrival of the same packet from N3 interface at I-UPF's ingress GTP termination; and 2) incrementing the corresponding bin with the delay range where the result of 1) falls into by 1 for the subcounters per 5QI and subcounters per S-NSSAI.

d) Each measurement is an integer representing the number of UL GTP PDUs measured with the delay within the range of the bin.

e) GTP.DelayU1InIUpfDistQoS.Bin.5QI, where Bin indicates a delay range which is vendor specific, and 5QI identifies the 5QI; GTP.DelayU1InIUpfDistSnssai.Bin.SNSSAI where Bin indicates a delay range which is vendor specific, and SNSSAI identifies the S-NSSAI.

f) UPFFunction.
g) Valid for packet switched traffic.
h) 5GS.

Figure 7:
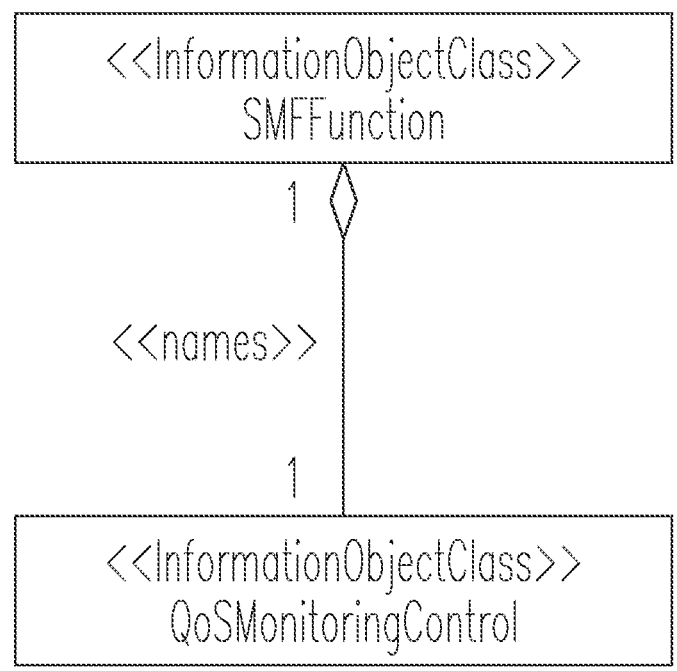
FIG. 7 illustrates a quality of service (QoS) monitoring control Information Object Class (IOC) in accordance with some embodiments.

3. For policy control of QoS monitoring, it is proposed to define the following IOC under SMFFunction for QoS monitoring control. FIG. 7 illustrates a quality of service (QoS) monitoring control Information Object Class (IOC) in accordance with some embodiments. The "QoSMonitoringControl" IOC may contain the following attributes:

>GTPEchoControl: for control the GTP Echo based solution (solution #1 above-mentioned)
>>IsGTPEchoEnabled: for switching on/off the GTP echo based method for QoS monitoring
>>GtpEchoIntervalPeriod: the period that the GTP Echo message is sent on a GTP path
>>MonitoredSNSSAIs: the S-NSSAIs to be monitored by the GTP Echo based solution
>>Monitored5QIs: the 5QIs to be monitored by the GTP Echo based solution
>GTPTimeStampControl: for control the GTP Time Stamp based solution (solution #2 above-mentioned)
>>IsGTPTimeStampEnabled: for switching on/off the GTP echo based method for QoS monitoring
>>GtpTimeStampPeriod: the period that the GTP time stamp is sent on a QoS flow
>>MonitoredSNSSAIs: the S-NSSAIs to be monitored by the GTP Time Stamp based solution
>>Monitored5QIs: the 5QIs to be monitored by the GTP Time Stamp based solution In addition, the e2e packet delay between UE and PSA UPF is a combination of the UL/DL packet delay on the Uu interface and the UL/DL packet delay between NG-RAN and PSA UPF. The NG-RAN may provide the QoS Monitoring on UL/DL packet delay on Uu interface. The QoS Monitoring on UL/DL packet delay between the NG-RAN and the PSA UPF can be performed on different levels of granularities, e.g., per QoS Flow per UE level, or per GTP-U path level, subject to the operators' configuration, and/or $3^{rd}$ party application request, and/or PCF policy control for the URLLC services.

The SMF may activate the end to end UL/DL packet delay measurement between the UE and PSA UPF for the QoS Flow during the PDU Session Establishment or Modification procedure.

The SMF may send a QoS Monitoring request to the RAN via N2 signalling. The QoS Monitoring request may contain monitoring parameters determined by the SMF based on the authorized QoS Monitoring policy received from the PCF and local configuration.

The NG-RAN may initiate the measurement of UL/DL packet delay on the Uu interface based on the QoS Monitoring request from SMF. The NG-RAN may report the UL/DL packet delay result on the Uu interface to the PSA UPF.

The SMF may send the QoS Monitoring request to the PSA UPF and the NG-RAN to request the QoS monitoring between the PSA UPF and the NG-RAN. The QoS Monitoring request may contain monitoring parameters determined by the SMF based on the authorized QoS Monitoring policy received from the PCF and local configuration.

If the NG-RAN and the PSA UPF are time synchronised, the one-way packet delay monitoring between the NG-RAN and the PSA UPF may be supported. The time stamp in the GTP-U header may be used for UL/DL packet delay measurement. The PSA UPF and the NG-RAN may calculate the UL packet delay and DL packet delay between the NG-RAN and the PSA UPF respectively based on the received time stamp in the GTP-U header of service packet and the local time. The NG-RAN may encapsulate the DL packet delay result in the GTP-U header of UL packet data sent to the UPF. The NG-RAN may send a dummy UL packet as the monitoring response packet to the UPF in case there is no UL service packet for UL packet delay monitoring.

If the NG-RAN and the PSA UPF are not time synchronised, it is assumed that the UL packet delay and the DL packet delay between the NG-RAN and the PSA UPF is the same. The PSA UPF may create and send the monitoring packets to the RAN, and calculate the round trip and the UL/DL packet delay between the NG-RAN and the anchor PSA UPF based on the time information contained in the GTP-U header of the received UL monitoring packets. The PSA UPF may calculate the UL/DL packet delay between the UE and the PSA UPF based on the received UL/DL packet delay results of the Uu interface and the UL/DL packet delay between the RAN and the PSA UPF. The PSA UPF may report the result to the SMF based on a specific condition, e.g., when a threshold for reporting to the SMF is reached.

From management perspective, the following is to be addressed: the SMF may not receive all of the delay measurements, but just a subset which meets the specific conditions (e.g., threshold is reached). Thus, management system should collect the delay measurements from the RAN and the PSA UPF; gor the packet delay measured by the PSA UPF, no measurements have been defined based on the time stamp approach.

The following measurements may be used: the UL packet delay between the PSA UPF and the NG-RAN for a"time synchronised" case, for the PSA UPF; the RTT packet delay between the PSA UPF and the NG-RAN for a "not time synchronised" case, for the PSA UPF; and the e2e RTT delay between the UE and the PSA UPF for a "not time synchronised" case, for the PSA UPF.

The performance measurements related to user plane data delay can be used to reflect the users' experience and optimize the delay performance when desired. With reference to FIGS. 5A and 5B, a service producer may collect the raw performance measurements from the NFs, and then generate the performance measurements for the NFs for its consumers. As above, the NF may be the UPF or the gNB (gNB-CU-UP), and the service producer may be implemented within the NF or in a separate management system.

Performance measurements may be defined in 3GPP TS 28.552 as:

5.1.1.x One-Way Packet Delay Between NG-RAN and PSA UPF 5.1.1.x.1 Average DL One-Way GTP Packet Delay Between PSA UPF and NG-RAN a) This measurement provides the average DL one-way GTP packet delay between PSA UPF and NG-RAN. This measurement is split into subcounters per 5QI and subcounters per S-NSSAI. This measurement is only applicable to the case the PSA UPF and NG-RAN are time synchronised.

b) DER (n=1).

c) This measurement may be obtained as: the sum (the time when receiving a DL GTP PDU from the UPF (PSA UPF or I-UPF) at the gNB-CU-UP's ingress GTP termination, minus time stamp in the GTP-U header indicating the time that the GTP PDU was sent by the PSA UPF) divided by total number of received GTP PDUs with the header including the time stamp. This measurement is calculated for each 5QI and for each S-NSSAI.

d) Each measurement is a real representing the average delay in microseconds.

e) GTP.OneWayDelayD1PsaUpfNgranMeanQoS.5QI, where 5QI identifies the 5QI; GTP.OneWayDelayD1PsaUpfNgranMeanSnssai.SNSSAI, where SNSSAI identifies the S-NSSAI.

f) EP_N3 (contained by GNBCUUPFunction).
g) Valid for packet switched traffic.
h) 5GS.

5.1.1.x.2 Distribution of DL One-Way GTP Packet Delay Between PSA UPF and NG-RAN a) This measurement provides the distribution of DL one-way GTP packet delay between PSA UPF and NG-RAN. This measurement is split into subcounters per 5QI and subcounters per S-NSSAI. This measurement is only applicable to the case the PSA UPF and NG-RAN are time synchronised.

b) DER (n=1).

c) This measurement may be obtained by 1) calculating the DL one-way GTP packet delay by: the time when receiving a DL GTP PDU from the UPF (PSA UPF or I-UPF) at the gNB-CU-UP's ingress GTP termination, minus time stamp in the GTP-U header indicating the time that the GTP PDU was sent by the PSA UPF; and 2) incrementing the corresponding bin with the delay range where the result of 1) falls into by 1 for the subcounters per 5QI and subcounters per S-NSSAI.

d) Each measurement is an integer representing the number of GTP PDUs measured with the delay within the range of the bin.

e) GTP.OneWayDelayD1PsaUpfNgranDistQoS.5QI.Bin.DSCP, where Bin indicates a delay range which is vendor specific, and 5QI identifies the 5QI; GTP.OneWayDelayD1PsaUpfNgranDistSnssai.Bin.SNSSAI, where Bin indicates a delay range which is vendor specific, and SNSSAI identifies the S-NSSAI.

f) EP_N3 (contained by GNBCUUPFunction).
g) Valid for packet switched traffic.
h) 5GS.

5.4.x One-Way Packet Delay Between NG-RAN and PSA UPF 5.4.x.1 Average UL One-Way GTP Packet Delay Between NG-RAN and PSA UPF a) This measurement provides the average UL one-way GTP packet delay between NG-RAN and PSA UPF. This measurement is split into subcounters per 5QI and subcounters per S-NSSAI. This measurement is only applicable to the case the PSA UPF and NG-RAN are time synchronised.

b) DER (n=1).

c) This measurement may be obtained as: the sum (the time when receiving a UL GTP PDU from the (NG-RAN or I-UPF) at the PSA UPF's ingress GTP termination, minus time stamp in the GTP-U header indicating the time that the GTP PDU was sent by the NG-RAN) divided by total number of received GTP PDUs with the header including the time stamp. This measurement is calculated for each 5QI and for each S-NSSAI.

d) Each measurement is a real representing the average delay in microseconds.

e) GTP.OneWayDelayU1NgranPsaUpfMeanQoS.5QI, where 5QI identifies the 5QI; GTP.OneWayDelayU1NgranPsaUpfMeanSnssai.SNSSAI, where SNSSAI identifies the S-NSSAI.

f) EP_N3 (contained by UPFFunction); EP_N9 (contained by UPFFunction).
g) Valid for packet switched traffic.
h) 5GS.

5.4.x.2 Distribution of UL One-Way GTP Packet Delay Between NG-RAN and PSA UPF a) This measurement provides the distribution of UL one-way GTP packet delay between NG-RAN and PSA UPF. This measurement is split into subcounters per 5QI and subcounters per S-NSSAI. This measurement is only applicable to the case the PSA UPF and NG-RAN are time synchronised.

b) DER (n=1).

c) This measurement may be obtained by 1) calculating the UL one-way GTP packet delay by: the time when receiving a UL GTP PDU from the NG-RAN or I-UPF at the PSA UPF's ingress GTP termination, minus time stamp in the GTP-U header indicating the time that the GTP PDU was sent by the NG-RAN; and 2) incrementing the corresponding bin with the delay range where the result of 1) falls into by 1 for the subcounters per 5QI and subcounters per S-NSSAI.

d) Each measurement is an integer representing the number of GTP PDUs measured with the delay within the range of the bin.

e) GTP.OneWayDelayU1NgranPsaUpfDistQoS.5QI.Bin.DSCP, where Bin indicates a delay range which is vendor specific, and 5QI identifies the 5QI; GTP.OneWayDelayU1NgranPsaUpfDistSnssai.Bin.SNSSAI, where Bin indicates a delay range which is vendor specific, and SNSSAI identifies the S-NSSAI.

f) EP_N3 (contained by UPFFunction); EP_N9 (contained by UPFFunction).

g) Valid for packet switched traffic.

h) 5GS.

A.x Monitoring of One-Way Delay Between PSA UPF and NG-RAN

The DL and UL one-way delay has direct impact to users' experience for some types of services (e.g., URLLC). The one-way delay between the PSA UPF and vNG-RAN is part of the end to end one-way delay and is not expected to be long as compared to the delay in between the NG-RAN and the UE. In case the PSA UPF and NG-RAN are time synchronised, the UL one-way delay can be measured by the PSA UPF and the DL one-way delay can be measured by the NG-RAN.

The measurements on the one-way DL and UL delay between the PSA UPF and the NG-RAN can be used to evaluate and optimize the DL and UL user plane delay performance between 5GC and NG-RAN.

5.4.x Round-Trip Packet Delay Between PSA UPF and NG-RAN 5.4.x.1 Average Round-Trip Packet Delay Between PSA UPF and NG-RAN a) This measurement provides the average round-trip GTP packet delay between PSA UPF and NG-RAN. This measurement is split into subcounters per 5QI and subcounters per S-NSSAI. This measurement is only applicable to the case the PSA UPF and NG-RAN are not synchronised.

b) DER (n=1).

c) The measurement may be obtained by the following method: For each DL GTP PDU (packet i) encapsulated with QFI, TEID, sequence number and QMP indicator for QoS monitoring, the PSA UPF may record the following time stamps and information (see 3GPP TS 23.501, herein incorporated by reference in its entirety): T1 that the DL GTP PDU was sent by the PSA UPF; T2 that the DL GTP PDU was received by the NG-RAN and T5 that the corresponding UL GTP PDU (with QMP indicator and the corresponding sequence number) was sent by the NG-RAN; T6 that the corresponding UL GTP PDU (with QMP indicator and the corresponding sequence number) was received by the PSA UPF. The 5QI and S-NSSAI associated to the DL GTP PDU.

The PSA UPF may count the number (N) of DL GTP PDUs encapsulated with QFI, TEID, sequence number and QMP indicator for each 5QI and each S-NSSAI respectively, and take the following calculation for each 5QI and each S-NSSAI:

$$\frac{\sum_{i=1}^{N}(T2_i - T1_i + T6_i - T5_i)}{N}$$

d) Each measurement is a real representing the average delay in microseconds.

e) GTP.RttDelayPsaUpfNgranMeanQoS.5QI, where 5QI identifies the 5QI; GTP.RttDelayPsaUpfNgranMeanSnssai.SNSSAI, where SNSSAI identifies the S-NSSAI.

f) EP_N3 (contained by UPFFunction); EP_N9 (contained by UPFFunction).

g) Valid for packet switched traffic.

h) 5GS.

5.4.x.2 Distribution of Round-Trip Packet Delay Between PSA UPF and NG-RAN a) This measurement provides the distribution of round-trip GTP packet delay between PSA UPF and NG-RAN. This measurement is split into subcounters per 5QI and subcounters per S-NSSAI. This measurement is only applicable to the case the PSA UPF and NG-RAN are not time synchronised.

b) DER (n=1).

c) The measurement may be obtained by the following method: For each DL GTP PDU (packet i) encapsulated with QFI, TEID, sequence number and QMP indicator for QoS monitoring, the PSA UPF records the following time stamps and information (see 3GPP TS 23.501): T1 that the DL GTP PDU was sent by the PSA UPF; T2 that the DL GTP PDU was received by NG-RAN and T5 that the corresponding UL GTP PDU (with QMP indicator and the corresponding sequence number) was sent by NG-RAN; T6 that the corresponding UL GTP PDU (with QMP indicator and the corresponding sequence number) was received by the PSA UPF. The 5QI and S-NSSAI associated to the DL GTP PDU.

The PSA UPF may 1) take the following calculation for each DL GTP PDU (packet i) encapsulated with QFI, TEID, sequence number and QMP indicator for each 5QI and each S-NSSAI respectively, and 2) increment the corresponding bin with the delay range where the result of 1) falls into by 1 for the subcounters per 5QI and subcounters per S-NSSAI.

$$T2_i - T1_i + T6_i - T5_i,$$

d) Each measurement is an integer representing the number of DL GTP PDUs measured with the delay within the range of the bin.

e) GTP.RttDelayPsaUpfNgranDistQoS.5QI.Bin.DSCP, where Bin indicates a delay range which is vendor specific, and 5QI identifies the 5QI; GTP.RttDelayPsaUpfNgranDistQoS.Bin.SNSSAI, where Bin indicates a delay range which is vendor specific, and SNSSAI identifies the S-NSSAI.

f) EP_N3 (contained by UPFFunction); EP_N9 (contained by UPFFunction).

g) Valid for packet switched traffic.

h) 5GS.

A.x Monitoring of Round-Trip Delay Between PSA UPF and NG-RAN

The end to end delay in 5G networks between the UE and the PSA UPF has direct impact to users' experience for some types of services (e.g., URLLC). The delay between the PSA UPF and the NG-RAN is part of the end to end one-way delay and is not expected to be long as compared to the delay in between the NG-RAN and the UE.

In case the PSA UPF and the NG-RAN are not time synchronised, the round-trip delay can be measured at the PSA UPF. The measurements on the round-trip delay between the PSA UPF and the NG-RAN can be used to evaluate and optimize the DL and UL user plane delay performance between the 5GC and the NG-RAN.

5.4.y Round-Trip Packet Delay Between PSA UPF and UE 5.4.y.1 Average Round-Trip Packet Delay Between PSA UPF and UE a) This measurement provides the average round-trip GTP packet delay between PSA UPF and UE. This measurement is split into subcounters per 5QI and subcounters per S-NSSAI. This measurement is only applicable to the case the PSA UPF and NG-RAN are not time synchronised.

DER (n=1).

The measurement may be obtained by the following method: For each DL GTP PDU (packet i) encapsulated with QFI, TEID, sequence number and QMP indicator for QoS monitoring, the PSA UPF may record the following time stamps and information (see 3GPP TS 23.501): T1 that the DL GTP PDU was sent by the PSA UPF; T6 that the corresponding UL GTP PDU (with QMP indicator and the corresponding sequence number) was received by the PSA UPF. The 5QI and S-NSSAI associated to the DL GTP PDU.

The PSA UPF may count the number (N) of DL GTP PDUs encapsulated with QFI, TEID, sequence number and QMP indicator for each 5QI and each S-NSSAI respectively, and take the following calculation for each 5QI and each S-NSSAI:

$$\frac{\sum_{i=1}^{N} (T6_i - T1_i)}{N}$$

d) Each measurement is a real representing the average delay in microseconds.

e) GTP.RttDelayPsaUpfUeMeanQoS.5QI, where 5QI identifies the 5QI; GTP.RttDelayPsaUpfUeMeanSnssai.S-NSSAI, where SNSSAI identifies the S-NSSAI.

f) EP_N3 (contained by UPFFunction); EP_N9 (contained by UPFFunction).

g) Valid for packet switched traffic.

h) 5GS.

5.4.y.2 Distribution of Round-Trip Packet Delay Between PSA UPF and UE a) This measurement provides the distribution of round-trip GTP packet delay between PSA UPF and UE. This measurement is split into subcounters per 5QI and subcounters per S-NSSAI. This measurement is only applicable to the case the PSA UPF and NG-RAN are not time synchronised.

b) DER (n=1).

c) The measurement may be obtained by the following method: For each DL GTP PDU (packet i) encapsulated with QFI, TEID, sequence number and QMP indicator for QoS monitoring, the PSA UPF records the following time stamps and information (see 3GPP TS 23.501): T1 that the DL GTP PDU was sent by the PSA UPF; T6 that the corresponding UL GTP PDU (with QMP indicator and the corresponding sequence number) was received by the PSA UPF. The 5QI and S-NSSAI associated to the DL GTP PDU.

The PSA UPF may 1) take the following calculation for each DL GTP PDU (packet i) encapsulated with QFI, TEID, sequence number and QMP indicator for each 5QI and each S-NSSAI respectively, and 2) increment the corresponding bin with the delay range where the result of 1) falls into by 1 for the subcounters per 5QI and subcounters per S-NSSAI.

$$T6_i - T1_i$$

d) Each measurement is an integer representing the number of DL GTP PDUs measured with the delay within the range of the bin.

e) GTP.RttDelayPsaUpfUeDistQoS.5QI.Bin.DSCP, where Bin indicates a delay range which is vendor specific, and 5QI identifies the 5QI; GTP.RttDelayPsaUpfUeDistQoS.Bin.SNSSAI, where Bin indicates a delay range which is vendor specific, and SNSSAI identifies the S-NSSAI.

f) EP_N3 (contained by UPFFunction); EP_N9 (contained by UPFFunction).

g) Valid for packet switched traffic.

h) 5GS.

A.y Monitoring of Round-Trip Delay Between PSA UPF and UE

The end to end delay in 5G networks between the UE and the PSA UPF has direct impact to users' experience for some types of services (e.g., URLLC). In case the PSA UPF and NG-RAN are not time synchronised, the round-trip delay between the PSA UPF and the UE can be measured at the PSA UPF. The measurements on the round-trip delay between PSA UPF and the NE can be used to evaluate the user plane delay performance in 5G networks and users' experience.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Thus, at least one of A or B, includes one or more of A, one or more of B, or one or more of A and one or more of B. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a session management function (SMF), the apparatus comprising:
processing circuitry to configure the apparatus to:
send, to a packet data unit (PDU) session anchor (PSA) user plane function (UPF) and next generation radio access network (NG-RAN), a request to provide a plurality of measurements selected from a set of measurements that include:
a distribution of delay downlink (DL) air-interface;
a distribution of delay DL in a $5^{th}$ generation NodeB central unit user plane (gNB-CU-UP);
a distribution of delay DL on an F1-U interface;
a distribution of radio link control (RLC) service data unit (SDU) packets delay on a DL within a gNB distributed unit (gNB-DU);
a distribution of internet protocol (IP) latency in DL within the gNB-DU;
an average round-trip delay on a N3 interface and a N9 interface on the PSA UPF and on an intermediate UPF (I-UPF);
a distribution of round-trip delay on the N3 interface and the N9 interface on the PSA UPF and on the I-UPF;
an average and distribution of DL and uplink (UL) General Packet Radio Service (GPRS) Tunneling Protocol (GTP) packets delay in the PSA UPF and in the I-UPF; and
round-trip delay between the PSA UPF and a user equipment (UE), round-trip delay between the PSA UPF and NG-RAN, and one way delay between the PSA UPF and the NG-RAN; and
receive, from the PSA UPF and NG-RAN, at least some of the measurements; and
a memory configured to store the measurements.

2. The apparatus of claim 1, wherein the distribution of delay DL air-interface for a plurality of RLC SDU packets includes:
a determination, for each GTP echo reply message, of a difference between a time when a last part of the RLC SDU packet was sent to the UE and confirmed by reception of hybrid automatic repeat request (HARD) acknowledgment (ACK) for unacknowledged mode (UM) or the last part of the RLC SDU packet was sent to the UE which was consequently confirmed by reception of a RLC ACK for acknowledged mode (AM) and a time when a RLC SDU part arrived at a medium access control (MAC) layer, and
for each difference, incrementation of a bin corresponding to a delay range of the difference.

3. The apparatus of claim 2, wherein the distribution of delay DL air-interface for a plurality of RLC SDU packets includes, for each RLC SDU packet, only an original contribution of the RLC SDU packet even if the AM is used and the RLC SDU packet is retransmitted.

4. The apparatus of claim 2, wherein the distribution of delay DL in the gNB-CU-UP is for a plurality of packet data convergence protocol (PDCP) SDU packets and includes:
a determination, for each PDCP SDU packet, of a difference between a time of transmission of the PDCP SDU packet to the gNB-DU at an egress PDCP layer on a F1-U/Xn-U interface and a time of arrival of the PDCP SDU packet at a NG-U ingress IP termination, and
for each difference, incrementation of a bin corresponding to a delay range of the difference.

5. The apparatus of claim 3, wherein the distribution of delay DL on the F1-U interface is for a plurality of GTP packets and includes:
a determination, for each GTP packet, of a difference between a time a GTP packet delivery status message was received from the gNB-DU at an egress GTP termination and a time the GTP packet was sent to the gNB-DU at a GTP ingress termination and a feedback delay time in the gNB-DU, and
for each difference, incrementation of a bin corresponding to a delay range of the difference.

6. The apparatus of claim 4, wherein the distribution of RLC SDU packets delay on the DL within the gNB-DU for a plurality of RLC SDU packets includes:
a determination, for each RLC SDU packet, of a difference between a time when a last part of the RLC SDU packet was scheduled and sent to a medium access control (MAC) layer for transmission over the air and a time of arrival of the RLC SDU packet at an RLC ingress F1-U termination, and
for each difference, incrementation of a bin corresponding to a delay range of the difference.

7. The apparatus of claim 5, wherein the distribution of IP latency in DL within the gNB-DU is for a plurality of latencies on the DL within the gNB-DU for a plurality of RLC SDU packets and includes:
a determination, for each RLC SDU packet, of a difference between a time a first piece of the RLC SDU packet is transmitted on an air interface and a time of arrival of the RLC SDU packet at an RLC ingress F1-U termination, and
for each difference, incrementation of a bin corresponding to a delay range of the difference.

8. The apparatus of claim 7, wherein the distribution of IP latency in DL within the gNB-DU is determined for IP packets for transmission to the UE arriving when there is no other prior data to be transmitted to the UE in the gNB-DU.

9. The apparatus of claim 1, wherein:
the average round-trip delay on the N3 interface on the PSA UPF is for a plurality of GTP echo reply messages and includes:
a determination, for each GTP echo reply message, of a difference between a time the GTP echo reply message was received from the gNB-CU-UP at an ingress GTP termination of the PSA UPF and a time an associated echo request message was sent to the gNB-CU-UP at an egress GTP termination of the PSA UPF, a sum of each difference, and a ratio of the sum over a total number of GTP echo reply messages received at the ingress GTP termination, and the distribution of round-trip delay on the N3 interface on the PSA UPF includes, for each difference, incrementation of a bin corresponding to a delay range of the difference.

10. The apparatus of claim 9, wherein:

the average round-trip delay on the N3 interface on the I-UPF includes:

a determination, for each GTP echo reply message, of a difference between a time the GTP echo reply message was received from the gNB-CU-UP at an ingress GTP termination of the I-UPF and a time an associated echo request message was sent to the gNB-CU-UP at an egress GTP termination of the I-UPF, a sum of each difference, and a ratio of the sum over a total number of GTP echo reply messages received at the ingress GTP termination, and the distribution of round-trip delay on the N3 interface on the I-UPF includes, for each difference, incrementation of a bin corresponding to a delay range of the difference.

11. The apparatus of claim 10, wherein:

the average round-trip delay on the N9 interface on the PSA UPF is for a plurality of GTP echo reply messages and includes:

a determination, for each GTP echo reply message, of a difference between a time the GTP echo reply message was received from the I-UPF at an ingress GTP termination of the PSA UPF and a time an associated echo request message was sent to the I-UPF at an egress GTP termination of the PSA UPF, a sum of each difference, and a ratio of the sum over a total number of GTP echo reply messages received at the ingress GTP termination, and the distribution of round-trip delay on the N9 interface on the PSA UPF includes, for each difference, incrementation of a bin corresponding to a delay range of the difference.

12. The apparatus of claim 11, wherein:

the average round-trip delay on the N9 interface on the I-UPF includes:

a determination, for each GTP echo reply message, of a difference between a time the GTP echo reply message was received from the PSA UPF at an ingress GTP termination of the I-UPF and a time an associated echo request message was sent to the PSA UPF at an egress GTP termination of the I-UPF, a sum of each difference, and a ratio of the sum over a total number of GTP echo reply messages received at the ingress GTP termination, and the distribution of round-trip delay on the N9 interface on the I-UPF includes, for each difference, incrementation of a bin corresponding to a delay range of the difference.

13. The apparatus of claim 12, wherein:

the average DL GTP packets delay within the PSA UPF is for a plurality of DL GTP packets and includes:

a determination, for each DL GTP packet, of a difference between a time the DL GTP packet was sent to the gNB-CU-UP or I-UPF at an egress GTP termination of the PSA UPF and a time of arrival of the DL GTP packet at an ingress IP termination of the PSA UPF for an N6 interface, a sum of each difference, and a ratio of the sum over a total number of DL GTP packets sent to the gNB-CU-UP or I-UPF, and the distribution of DL GTP packets delay within the PSA UPF includes, for each difference, incrementation of a bin corresponding to a delay range of the difference.

14. The apparatus of claim 13, wherein:

the average UL GTP packets delay within the PSA UPF is for a plurality of UL GTP packets and includes:

a determination, for each UL GTP packet, of a difference between a time the UL GTP packet was sent at an egress IP termination of the PSA UPF for an N6 interface and a time of arrival of a corresponding UL GTP SDU packet from an N3 or N9 interface at an ingress GTP termination of the PSA UPF, a sum of each difference, and a ratio of the sum over a total number of UL GTP packets sent to the N6 interface, and the distribution of UL GTP packets delay within the PSA UPF includes, for each difference, incrementation of a bin corresponding to a delay range of the difference.

15. The apparatus of claim 14, wherein:

the average DL GTP packets delay within the I-UPF is for a plurality of DL GTP packets and includes:

a determination, for each DL GTP packet, of a difference between a time the DL GTP packet was sent to the gNB-CU-UP at an egress GTP termination of the I-UPF and a time of arrival of the DL GTP packet at an ingress GTP termination of the I-UPF for an N9 interface, a sum of each difference, and a ratio of the sum over a total number of DL GTP packets sent to the gNB-CU-UP, and the distribution of DL GTP packets delay within the PSA UPF includes, for each difference, incrementation of a bin corresponding to a delay range of the difference.

16. The apparatus of claim 15, wherein:

the average UL GTP packets delay within the PSA UPF is for a plurality of DL GTP packets and includes:

a determination, for each UL GTP packet, of a difference between a time the UL GTP packet was sent at an egress GTP termination of the I-UPF and a time of arrival of the UL GTP packet from an N3 interface at an ingress GTP termination of the I-UPF, a sum of each difference, and a ratio of the sum over a total number of UL GTP packets sent to the PSA UPF, and the distribution of UL GTP packets delay within the PSA UPF includes, for each difference, incrementation of a bin corresponding to a delay range of the difference.

17. The apparatus of claim 1, wherein the processing circuitry is further to configure the apparatus to send the measurements to a management system for detection of network issues and prevention or mitigation of the network issues.

18. The apparatus of claim 1, wherein the processing circuitry is further to configure the apparatus to:

activate an end to end UL/DL packet delay measurement between the UE and PSA UPF for a quality of service (QoS) Flow during a PDU Session Establishment or Modification procedure, receive, from a policy control function (PCF), an authorized QoS Monitoring policy, determine, based on the authorized QoS Monitoring policy, monitoring parameters, send a QoS Monitoring request to a radio access network (RAN) via N2 signalling, the QoS Monitoring request containing the monitoring parameters for QoS monitoring, and receive, from the PSA UPF, a report of a result of the QoS monitoring in response to a threshold for reporting being reached.

19. A non-transitory computer-readable storage medium that stores instructions for execution by one or more processors configured to provide a session management function (SMF), the one or more processors to configure the SMF to, when the instructions are executed:

send, to a packet data unit (PDU) session anchor (PSA) user plane function (UPF) and next generation radio access network (NG-RAN), a request to provide a plurality of measurements from a set of measurements that include:

a distribution of delay downlink (DL) air-interface;

a distribution of delay DL in a $5^{th}$ generation NodeB central unit user plane (gNB-CU-UP);

a distribution of delay DL on an F1-U interface;

a distribution of radio link control (RLC) service data unit (SDU) packets delay on a DL within a gNB distributed unit (gNB-DU);

a distribution of internet protocol (IP) latency in DL within the gNB-DU;

an average round-trip delay on a N3 interface and a N9 interface on the PSA UPF and on an intermediate UPF (I-UPF);

a distribution of round-trip delay on the N3 interface and the N9 interface on the PSA UPF and on the I-UPF;

an average and distribution of DL and uplink (UL) General Packet Radio Service (GPRS) Tunneling Protocol (GTP) packets delay within the PSA UPF;

an average and distribution of DL and UL GTP packets delay within the I-UPF; and round-trip delay between the PSA UPF and a user equipment (UE), round-trip delay between the PSA UPF and NG-RAN, and one way delay between the PSA UPF and the NG-RAN; and receive, from the PSA UPF and NG-RAN, at least some of the measurements.

20. The medium of claim 19, wherein the distribution of delay DL air-interface for a plurality of RLC SDU packets is:

a determination, for each GTP echo reply message, of a difference between a time when a last part of the RLC SDU packet was sent to the UE and confirmed by reception of hybrid automatic repeat request (HARD) acknowledgment (ACK) for unacknowledged mode (UM) or the last part of the RLC SDU packet was sent to the UE which was consequently confirmed by reception of a RLC ACK for acknowledged mode (AM) and a time when a RLC SDU part arrived at a medium access control (MAC) layer, and for each difference, incrementation of a bin corresponding to a delay range of the difference.

* * * * *

UNITED STATES PATENT AND TRADEMARK OFFICE
CERTIFICATE OF CORRECTION

PATENT NO. : 11,778,491 B2
APPLICATION NO. : 16/939732
DATED : October 3, 2023
INVENTOR(S) : Yao et al.

Page 1 of 1

It is certified that error appears in the above-identified patent and that said Letters Patent is hereby corrected as shown below:

In the Claims

In Column 35, Line 66, in Claim 2, delete "(HARD)" and insert --(HARQ)-- therefor In Column 40, Line 22, in Claim 22, delete "(HARD)" and insert --(HARQ)-- therefor Signed and Sealed this
Seventh Day of October, 2025

John A. Squires
*Director of the United States Patent and Trademark Office*